United States Patent [19]

Nishikawa et al.

[11] Patent Number: 4,866,624
[45] Date of Patent: Sep. 12, 1989

[54] DEVICE FOR CONTROLLING VEHICLE FOUR WHEEL DRIVE FRONT/REAR COUPLING DEVICE ACCORDING TO ROTATIONAL SPEEDS OF FRONT AND REAR VEHICLE WHEELS AND METHOD OF OPERATION THEREOF

[75] Inventors: Seiichi Nishikawa; Tadashi Saitou, both of Toyota, Japan

[73] Assignee: Toyota Jidosha Kabushiki Kaisha, Aichi, Japan

[21] Appl. No.: 59,580

[22] Filed: Jun. 8, 1987

[30] Foreign Application Priority Data

Jun. 10, 1986 [JP] Japan ................................ 61-134391

[51] Int. Cl.$^4$ ............................................. B60K 17/34
[52] U.S. Cl. ........................... 364/426.03; 364/424.1; 180/249; 180/197
[58] Field of Search ............... 364/426, 424.1; 74/866; 180/249, 247, 248, 426.2, 426.3, 197

[56] References Cited

U.S. PATENT DOCUMENTS

| | | | |
|---|---|---|---|
| 4,298,085 | 11/1981 | Moroto et al. | 180/249 |
| 4,552,241 | 11/1985 | Suzuki | 180/197 |
| 4,589,511 | 5/1986 | Leiber | 180/197 |
| 4,699,236 | 10/1987 | Morisawa et al. | 364/424.1 |
| 4,702,341 | 10/1987 | Taga et al. | 364/424.1 |
| 4,729,450 | 3/1988 | Morisawa et al. | 364/424.1 |
| 4,751,856 | 6/1988 | Nakamura et al. | 180/249 |
| 4,757,870 | 7/1988 | Torii et al. | 364/424.1 |

FOREIGN PATENT DOCUMENTS 50-147027 11/1975 Japan .
55-72420 5/1980 Japan .
56-138020 10/1981 Japan .
57-15019 1/1982 Japan .

Primary Examiner—Parshotam S. Lall
Assistant Examiner—V. N. Trans
Attorney, Agent, or Firm—Oliff & Berridge

[57] ABSTRACT

In a four wheel drive vehicle, a four wheel drive device receives rotational power from an engine and provides it to the combination of the front wheels of the vehicle and also to the combination of the rear wheels of the vehicle. A device is provided for selectively coupling the rotation of the combination of the front vehicle wheels and the rotation of the combination of the rear vehicle wheels. A control device is provided for this front/rear coupling device, and includes: (a) a means for detecting the rotational speed of the combination of the front wheels of the vehicle; (b) a means for detecting the rotational speed of the combination of the rear wheels of the vehicle; and: (c) a means for controlling the front/rear coupling device, so that its operation is substantially not restricted when the discrepancy between the rotational speed of the combination of the front wheels of the vehicle and the rotational speed of the combination of the rear wheels of the vehicle is not greater than a certain threshold value; while, when the discrepancy between the rotational speed of the combination of the front wheels of the vehicle and the rotational speed of the combination of the rear wheels of the vehicle is greater than the certain threshold value, coupling between the rotation of the combination of the front vehicle wheels and the rotation of the combination of the rear vehicle wheels is substantially prohibited. The method of operation of this device is also disclosed.

14 Claims, 9 Drawing Sheets

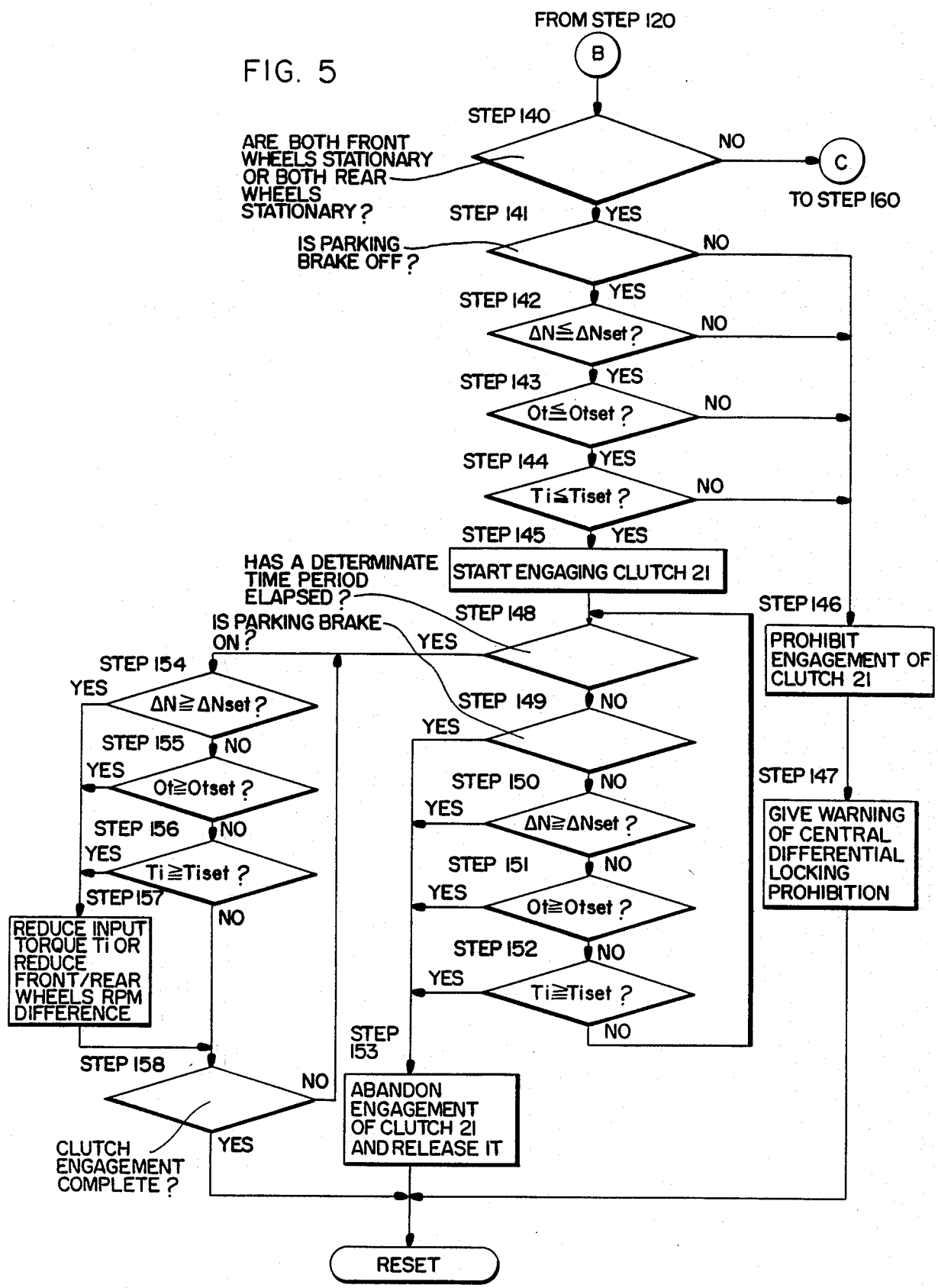

DEVICE FOR CONTROLLING VEHICLE FOUR WHEEL DRIVE FRONT/REAR COUPLING DEVICE ACCORDING TO ROTATIONAL SPEEDS OF FRONT AND REAR VEHICLE WHEELS AND METHOD OF OPERATION THEREOF

BACKGROUND OF THE INVENTION

The present invention relates to a vehicle four wheel drive front/rear coupling device control device and to a method of operation thereof, for a vehicle adapted for four wheel drive operation and incorporating a four wheel drive power transmission system, and more particularly relates to such a vehicle four wheel drive front/rear coupling device control device and method of operation thereof for a vehicle such as an automobile incorporating such a four wheel drive power transmission system, and front/rear coupling device control device and method providing control according to the discrepancy between the rotational speed of the rear vehicle wheels and the rotational speed of the front vehicle wheels.

The present invention has been described in Japanese patent application Ser. No. Showa 61-134391 (1986), which was filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and driveability for the vehicle in conditions where the coefficient of friction between the wheels and the surface upon which the vehicle is being operated is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front-rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof (and also for various other reasons). And such provision of such a central or front-rear differential device is effective for achieving this result. Further, it has been practiced to provide an automatic transmission system to a vehicle which is equipped with such a four wheel drive type transmission. Such a type of structure is disclosed, for example, in Japanese patent application Laying Open Publication Seri. No. 56-138020 (1981). Further, it is per se conventional to provide, to such a center differential device, a torque distribution control clutch such as a central differential control clutch, which serves for regulating the distribution of the drive torque produced by the engine of the vehicle between the rear wheels of the vehicle (taken as a combination) and the front wheels of the vehicle (taken as a combination). Such a type of construction is disclosed, for example, in Japanese patent application Laying Open Publication Ser. No. 50-14027 (1975), in Japanese patent application Laying Open Publication Ser. No. 55-72420 (1980), and in Japanese patent application Laying Open Publication Ser. No. 57-15019 (1982). And such a torque distribution control clutch such as a central differential control clutch is typically controlled by a hydraulically operated servo device, so that the engagement pressure of said torque distribution control clutch, i.e. the maximum amount of torque that said torque distribution control clutch can transmit, which defines the amount of torque redistribution which said torque distribution control clutch can provide between the rear wheels of the vehicle (taken as a combination) and the front wheels of the vehicle (taken as a combination), is regulated by the magnitude of an actuating hydraulic fluid pressure. And such an actuating hydraulic fluid pressure is typically provided by a control system such as a hybrid electrical/hydraulic control system which may include a microcomputer.

Such a torque distribution control clutch or central differential action restriction means is typically provided for the following reason. If even one of the vehicle wheels slips, which may well occur especially when the vehicle is being operated upon a bad road surface such as when it is raining, it is snowing, or when the road is muddy, drive power will be lost, whereupon there is the problem that because of the differential effect of the center differential device the drive power of all wheels will be reduced, and the so called trailblazability of the vehicle will be severely deteriorated. In, therefore, a four wheel drive device having a center differential device, such a differential restriction device is typically provided, and is typically operated according to vehicle operational conditions. A four wheel drive device has already been proposed, constructed so that, when the difference between the rear wheel revolution rate and the front wheel revolution rate is at least a certain value, that is, when one vehicle tire is slipping with respect to the road surface, the differential control clutch is engaged, and the rear wheels and front wheels are directly coupled, whereas at other times the differential control clutch is released and the center differential device is allowed to carry out a differential effect; this is described in Japanese Patent Laying Open Publication Sho 55-72420 (1980).

With the provision such a differential control clutch, when said clutch is engaged then a condition of coupled or substantially coupled front/rear wheel operation of the vehicle is set up. This means that the driving characteristics of the vehicle are improved, so that, for example, when the vehicle is being operated upon a bad road surface such as when it is raining, it is snowing, or when the road is muddy, the vehicle is less likely to skid or get out of control, and further any single one of the vehicle wheels which would otherwise slip, for example if said when should fall into a wet hole or the like, is prevented from thereby suffering a loss of drive power.

On the other hand, there is a problem that arises with regard to the durability of such a front/rear coupling device for a four wheel drive vehicle like the above described type of clutch for such a central differential device. Namely, if the front/rear coupling device is engaged from the disengaged condition at a time when the difference between the rotational speed of the rear wheels of the vehicle and the rotational speed of the front wheels of the vehicle is high, as for example when one or more of said vehicle wheels is spinning at relatively high speed as when it has fallen into a slippery hole or the like and is spinning ineffectually, then considerable wear can take place on said front/rear coupling device, and this can deteriorate the performance and the service life thereof.

SUMMARY OF THE INVENTION

The inventors of the present invention have considered the problem detailed above in the aforementioned type of four wheel drive type vehicle incorporating such a four wheel drive power transmission system with a front/rear coupling device, and have considered various possibilities for controlling such a front/rear coupling device.

Accordingly, it is the primary object of the present invention to provide an improved vehicle four wheel drive front/rear coupling device control device for a four wheel drive type vehicle, and a corresponding method for operating such a device, which avoid the problems detailed above.

It is a further object of the present invention to provide such a vehicle four wheel drive front/rear coupling device control device and method, which ensure that said front/rear coupling device is not subjected to undue wear conditions.

It is a further object of the present invention to provide such a vehicle four wheel drive front/rear coupling device control device and method, which ensure that the service life of said front/rear coupling device is not unduly deteriorated.

It is a yet further object of the present invention to provide such a vehicle four wheel drive front/rear coupling device control device and method, which ensure that, on bad roads and the like, even if slipping of one of a plurality of vehicle wheels with respect to the road surface being driven on occurs, good trailblazability can be carried out with smooth starting off of the vehicle from rest.

According to the most general device aspect of the present invention, these and other objects are attained by, for a four wheel drive vehicle with two front wheels, two rear wheels, a four wheel drive device, and an engine, rotational power from said engine being provided via said four wheel drive device to the combination of the front wheels of said vehicle and also to the combination of the rear wheels of said vehicle, and further comprising a front/rear coupling device fitted to said four wheel drive device for selectively coupling the rotation of said combination of said front vehicle wheels and the rotation of said combination of said rear vehicle wheels: a device for controlling said front/rear coupling device, comprising: (a) a means for detecting the rotational speed of said combination of the front wheels of said vehicle; (b) a means for detecting the rotational speed of said combination of the rear wheels of said vehicle; and: (c) a means for controlling said front/rear coupling device, so that: said operation of said front/rear coupling device is substantially not restricted when the discrepancy between the rotational speed of said combination of the front wheels of said vehicle and the rotational speed of said combination of the rear wheels of said vehicle is not greater than a certain threshold value; and, when the discrepancy between the rotational speed of said combination of the front wheels of said vehicle and the rotational speed of said combination of the rear wheels of said vehicle is greater than said certain threshold value, coupling between the rotation of said combination of said front vehicle wheels and the rotation of said combination of said rear vehicle wheels by said front/rear coupling device is substantially prohibited; and, according to the most general method aspect of the present invention, these and other objects are attained by, for a four wheel drive vehicle with two front wheels, two rear wheels, a four wheel drive device, and an engine, rotational power from said engine being provided via said four wheel drive device to the combination of the front wheels of said vehicle and also to the combination of the rear wheels of said vehicle, and further comprising a front/rear coupling device fitted to said four wheel drive device for selectively coupling the rotation of said combination of said front vehicle wheels and the rotation of said combination of said rear vehicle wheels: a method for controlling said front/rear coupling device, wherein: (a) the rotational speed of said combination of the front wheels of said vehicle is detected; (b) the rotational speed of said combination of the rear wheels of said vehicle is detected; and: (c) said front/rear coupling device is controlled, so that: said operation of said front/rear coupling device is substantially not restricted when the discrepancy between the rotational speed of said combination of the front wheels of said vehicle and the rotational speed of said combination of the rear wheels of said vehicle is not greater than a certain threshold value; and, when the discrepancy between the rotational speed of said combination of the front wheels of said vehicle and the rotational speed of said combination of the rear wheels of said vehicle is greater than said certain threshold value, coupling between the rotation of said combination of said front vehicle wheels and the rotation of said combination of said rear vehicle wheels by said front/rear coupling device is substantially prohibited.

The logic for mensurating the discrepancy between the rear wheel rotational speed and the front wheel rotational speed may be either by calculating the rotation rate difference or by calculating the rotational speed ratio.

The device used for the application of the control device and the control method according to the present invention is typically capable of varying freely its maximum torque transmission capacity in response to an external control signal, and as this differential restriction device may be used a hydraulic servo type of wet multi plate clutch, an electromagnetic powder clutch, or the like.

According to such a device and such a method as described above, when the magnitude of the discrepancy between the rear wheel rotational speed and the front wheel rotational speed is not more than the certain threshold value, then the operation of the front/rear coupling device is not interfered with; but, on the other hand, when the magnitude of said discrepancy between the rear wheel rotational speed and the front wheel rotational speed comes to be greater than said certain threshold value, then said front/rear coupling device is substantially prevented from coupling between the rotation of said combination of said front vehicle wheels and the rotation of said combination of said rear vehicle wheels, thus ensuring that large energy is not developed in said front/rear coupling device, and thereby maximizing its durability and its service life.

According to various particular specializations of the concept of the present invention: the value of the torque which is being inputted to said four wheel drive device may be detected, and in this case said certain threshold value of difference between the rotational speed of said rear wheels of said vehicle and the rotational speed of said front wheels of said vehicle may be set to be the lower, the higher is the value of the torque which is being inputted to said four wheel drive device; or, alternatively, said certain threshold value of difference between the rotational speed of said rear wheels of said vehicle and the rotational speed of said front wheels of said vehicle may be set to be the lower, the higher is the value of the output torque of said engine; or, again alternatively, in the case that said vehicle further comprises a speed change device provided in the power train between said engine and said four wheel drive device, said certain threshold value of difference between the rotational speed of said rear wheels of said vehicle and the rotational speed of said front wheels of said vehicle may be set to be the lower, the lower is the speed stage to which said speed change device is set.

BRIEF DESCRIPTION OF THE DRAWINGS

The present invention will now be described with respect to the preferred embodiment of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and chambers and flow chart steps and so on; and:

FIG. 5 is a third portion of said fragmentary flow chart for showing the operation of this preferred method embodiment, (in one of its branches) leading from said program point "B" shown in the FIG. 4 flow chart to a program point denoted in this figure as "C";

DESCRIPTION OF THE PREFERRED EMBODIMENTS

The present invention will now be described with reference to the preferred embodiments of the device and of the method thereof, and with reference to the figures.

Overall Vehicle Power Train Structure

Figure 1:
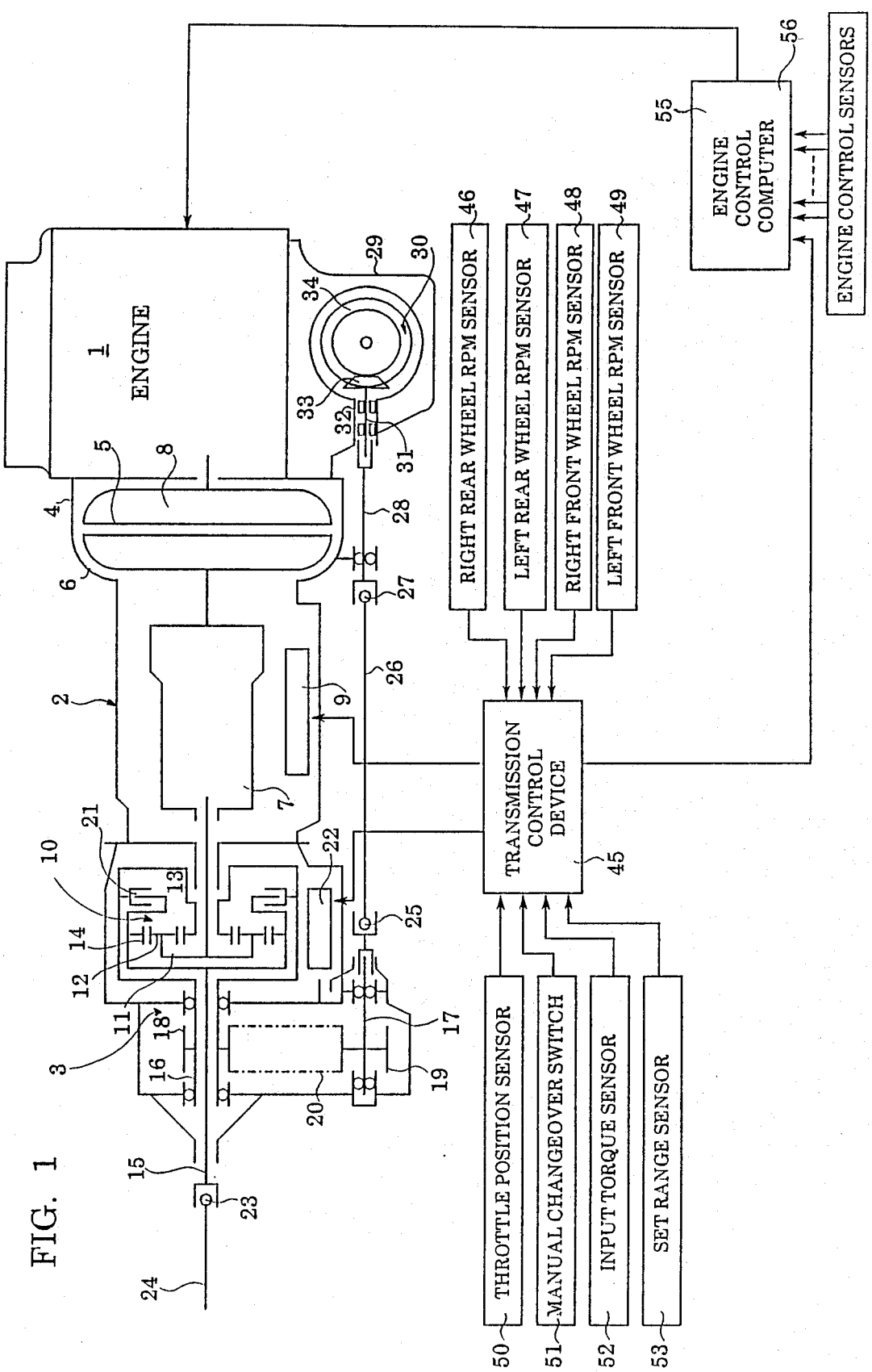
FIG. 1 is a schematic longitudinal skeleton view of a power train for a four wheel drive vehicle which incorporates a four wheel drive front/rear coupling device, and includes a schematic block diagrammatical view of a control system for said front/rear coupling device which incorporates the preferred embodiment of the vehicle four wheel drive front/rear coupling device control device of the present invention, for practicing the preferred method embodiment.

FIG. 1 is a schematic longitudinal skeleton view of a power train of a vehicle, which incorporates the preferred embodiment of the control device of the present invention for controlling a vehicle four wheel drive front/rear coupling device, said control device performing the preferred method embodiment. In this figure, the reference numeral 1 denotes an internal combustion engine of the vehicle, which is mounted, in this exemplary case, longitudinally in the front engine room (not particularly shown) of said vehicle. And the reference numeral 2 denotes an automatic speed change device (automatic transmission) of a per se known type mounted to the rear of the engine 1, while 3 denotes a four wheel drive power transfer device which is always operating in so called full time four wheel drive mode, so as always to drive both the rear pair of wheels of the vehicle and also the front pair of wheels of the vehicle, albeit with a certain differential action which is provided by this four wheel drive power transfer device 3 being selectably either not provided at all, being provided to a limited degree, or being fully provided, as will be explained in detail hereinafter.

In more detail, in this exemplary construction, the internal combustion engine 1 is of a fuel injection type, and the amount of the fuel injection to said engine 1 and the timing and the like thereof are controlled according to one facet of the operation of an engine control device 55, which receives the outputs of various engine parameter sensors, collectively designated by the reference numeral 56, and which also receives the output of a transmission control device 45, to be explained in detail later. This control of the engine 1 by the engine control device 55 may be of a per se known type, and as far as its conventional aspects are concerned it will not be discussed in detail in this specification.

And the automatic speed change device 2 incorporates a fluid torque converter 5 of a per se known construction, and the power input member 8 of this fluid torque converter 5 is connected via an input shaft to and receives rotational power from a crank shaft of the internal combustion engine 1. And the fluid torque converter 5 is housed within a torque converter housing 4 which is fitted against and is secured to the main body of the internal combustion engine 1, while the automatic speed change device 2 comprises a gear transmission mechanism 7, which is likewise housed within a speed change device housing 6 fitted against and secured to the torque converter housing. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated; such arrangements are not particularly shown) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided in a per se known manner by an electrically controlled electric/hydraulic control mechanism 9 of a per se known sort including various speed change valves and/or solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle and the rear wheels of the vehicle during the full time four wheel drive operation thereof. Now the detailed construction of this center differential device 10 will be explained. It comprises a sun gear 13, a ring gear 14, a carrier 11, and a plurality of planetary pinions 12 which are rotatably mounted to said carrier 11 and are meshed between the sun gear 13 and the ring gear 14 and which perform planetary movement between the same in a per se known manner. The carrier 11 functions as an input member for this center differential device 10, and said carrier 11 is rotationally connected to the output shaft of the gear transmission mechanism 7 via a transfer shaft which passes through a central axial hole which is pierced through the hollow sun gear 13. The ring gear 14 functions as one power output member for the center differential device 10 for supplying power to the rear wheels of the vehicle, and said ring gear 14 is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16, via a drum member which fits around the entire differential device. This intermediate front wheel drive shaft 16 is formed as a tubular hollow member which is fitted around the rear wheel power output shaft 15, and on its outside there is fixedly mounted a sprocket wheel 18. An endless chain 20 is fitted around this sprocket wheel 18 and also around another sprocket wheel 19 provided below said sprocket wheel 18, from the point of view of the figure and in the actual vehicle body also, and the central axis of this sprocket wheel 19 extends parallel to the central axis of the sprocket wheel 18. This sprocket wheel 19 is fixedly mounted on one end of a front wheel power output shaft 17, the other end of which protrudes from the housing of this four wheel drive power transfer device 3 in the rightwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating freely (i.e. when a clutch 21 to be described shortly is in the fully released condition), is determined by the relative tooth counts of the sun gear 13 and the ring gear 14 by the expressions $Rr=1/(1+Rg)$ and $Rf=Rg(1+Rg)$, where Rr is the rear wheel distribution ratio, Rf is the front wheel distribution ratio, and Rg is the ratio of the number of teeth on the sun gear 13 to the number of teeth on the ring gear 14. Because the number of teeth on the sun gear 13 is naturally greater than the number of teeth on the ring gear 14, thus, providing that the number of teeth on the sprocket wheel 18 and the number of teeth on the sprocket wheel 19 are the same, and the gearing ratios of the differential devices for the front pair of vehicle wheels and for the rear pair of vehicle wheels are the same, this four wheel drive power transfer device 3 is of the type which distributes a larger amount of torque to the rear vehicle wheels than to the front vehicle wheels. In fact, in this exemplary implementation, the center differential device 10 is so configured that, when the vehicle is being accelerated away from a substantially stationary condition at substantially the maximum acceleration which can be afforded by the engine 1 at substantially full throttle operation with the gear transmission mechanism 7 of the automatic speed change device 2 being engaged to its first speed stage, the torque distribution ratio between the rear vehicle wheels and the front vehicle wheels substantially corresponds to the weight distribution ratio at that time between said rear vehicle wheels and said front vehicle wheels.

Within the four wheel drive power transfer device 3 there is provided a hydraulically operated wet type clutch 21, which selectively rotationally connects together the sun gear 13 and the ring gear 14, either completely or partially, or alternatively allows said members to rotate freely with respect to one another. This wet clutch 21, the construction and the actuation of which will be explained in some detail shortly, is selectively operated to a greater or lesser engagement extent (this expression relates to the maximum torque transmission capability of said wet clutch 21) by supply of actuating hydraulic fluid pressure of a greater or lesser pressure value from an electrically actuated electric/hydraulic control device 22, a partial exemplary construction for which will be outlined hereinafter. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide (in the case that the wet clutch 21 is fully disengaged) substantially free differential action for distributing said rotational power between said rear wheel power output shaft 15 and said front wheel power output shaft 17, or not to provide (in the case that the wet clutch 21 is fully engaged) any such differential action at all and just to drive said power output shafts 15 and 17 independently, or to provide (in the case that the wet clutch 21 is partially but not fully engaged) a condition intermediate between these two extreme conditions, so as to partly allow the center differential device 10 to provide its differential action for distributing said rotational power between said rear wheel power output shaft 15 and said front wheel power output shaft 17 to some extent, while being somewhat impeded by the dragging action of the clutch 21, up to a certain maximum dragging action amount, which is determined by the maximum torque transmission capacity of said wet clutch 21 in the particular operational circumstances.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the casing 6 of the automatic speed change device 2 including the fluid torque converter 5 therein, roughly parallel to the longitudinal axis thereof and on one side thereof. The front end of this front wheel propeller shaft 26 is rotationally connected, via another universal joint 27 also of a per se known sort, via a short intermediate shaft 28 which is supported from the torque converter casing 4 by means of a bearing assembly, and via yet another universal joint also of a per se known sort, to the outer end of a drive pinion shaft 31 which constitutes the power input shaft of a front differential device 30 which drives the front wheels (not shown) of the vehicle. And this drive pinion shaft 31 is also rotatably supported at its intermediate portion via a pair of bearings from the casing 32 of the front differential device 30 (this casing 32 is integrally formed with the oil pan of the internal combustion engine 1), and the inner end of this drive pinion shaft 31 is provided with a drive pinion 33 which is constituted as a bevel gear, with said drive pinion 33 being meshingly engaged with driven ring gear 34 of the front differential device 30.

Operation of this Power Train

This vehicle power train operates as follows. When the clutch 21 of the four wheel drive power transfer device 3 is operated by the electrically actuated electric/hydraulic control device 22 so as not at all to rotationally connect together the sun gear 13 and the ring gear 14, so that said clutch 21 is fully disengaged, then the center differential device 10 functions so as to provide its differential effect between the rear wheel power output shaft 15 and the intermediate front wheel drive shaft 17 in full measure, i.e. so as to receive rotational power provided by the engine 1 of the vehicle and transmitted to said four wheel drive power transfer device 3 via the automatic speed change device 2, and so as to distribute said rotational power, while providing a non damped differential effect, between the rear wheels of the vehicle taken as a combination and the front wheels of the vehicle taken as a combination. On the other hand, when the clutch 21 of the four wheel drive power transfer device 3 is operated by the electrically actuated electric/hydraulic control device 22 so as to completely rotationally connect together the sun gear 13 and the ring gear 14, i.e. so as to be fully engaged and so to provide an effectively unlimited degree of torque transmission, then the center differential device 10 functions so as to provide no such differential effect at all between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 8 of the vehicle taken as a combination in an even fashion without any provision of any differential effect at all. And, in the intermediate case between these two extremes, when said clutch 21 of said four wheel drive power transfer device 3 is operated by said electrically actuated electric/hydraulic control device 22 so as somewhat to rotationally connect together said sun gear 13 and said ring gear 14, i.e. so as to be partially but not fully engaged and so as to provide a certain relatively limited degree of dragging or torque transmitting effect between these members, then said center differential device 10 functions so as to provide its differential effect between said rear wheel power output shaft 15 and said intermediate front wheel drive shaft 17 to a relatively limited or partial degree, i.e. so as to receive rotational power provided by said engine 1 of said vehicle and transmitted to said four wheel drive power transfer device 3 via said automatic speed change device 2, and so as to distribute said rotational power, while providing a partially damped differential effect, between said rear wheels of said vehicle taken as a combination and said front wheels of said vehicle taken as a combination.

The Central Differential Control Clutch 21 and its Actuating System

Figure 2:
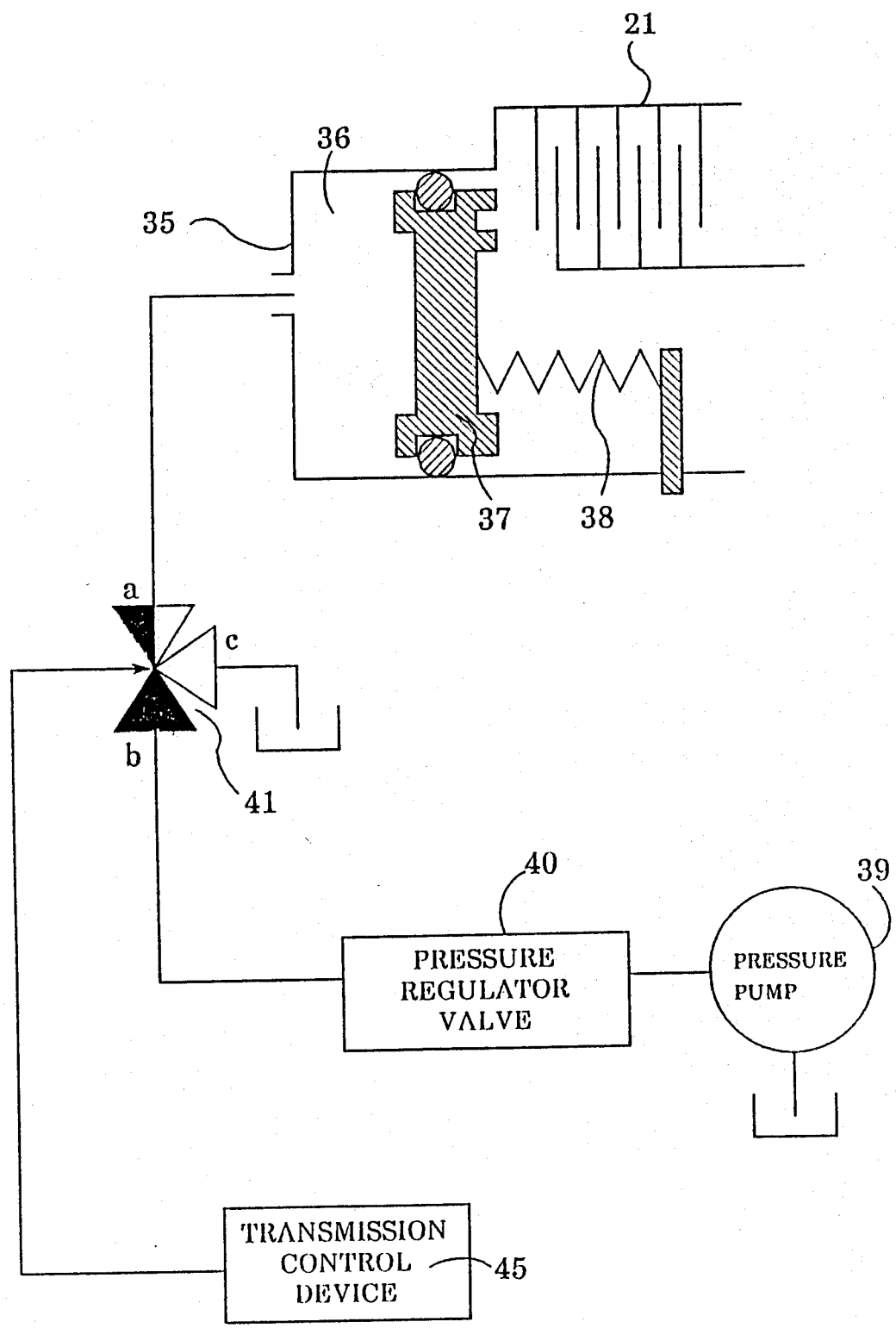
FIG. 2 is a schematic longitudinal part sectional view of a torque transfer clutch which is provided to a center differential device of the FIG. 1 power train, and of an actuating servo device therefor, and includes a partial schematic block diagrammatical view of a device for supplying hydraulic fluid pressure to said actuating servo device for actuating said torque transfer clutch, for showing details of their constructions, said torque transfer clutch and said actuating servo device therefor being incorporated in said vehicle four wheel drive front/rear coupling device and being controlled by said preferred embodiment of the control device therefor of the present invention, according to the preferred method embodiment.

In FIG. 2, there are shown a schematic longitudinal part cross sectional view of the central differential control clutch 21 of the four wheel drive power transfer device 3, and of a servo device 35 therefor, and also shows a partial schematic block diagrammatical view of a system for supplying actuating hydraulic fluid pressure to said servo device 35 for controlling said clutch 21, as incorporated in the shown central differential operation restriction device or front/rear coupling device, to which the preferred embodiment of the control device therefor of the present invention is applied; however, this particular arrangement should not be taken as unduly limitative of the present invention, as other possibilities for these structures could also be implemented, in alternative constructions. In this figure, the central differential control clutch 21 is shown as being a hydraulic servo type wet clutch, comprising two sets of mutually interleaved and sandwiched together clutch plates, one of said clutch plates sets being rotationally fixed with respect to the sun gear 13 of the center differential device 10, while the other said set of clutch plates are rotationally fixed with respect to the ring gear 14 of said center differential device 10. Thus, when these two sets of clutch plates are squeezed together by the servo device 35 as will be explained in detail shortly, a maximum torque transmission capability between the sun gear 13 and the ring gear 14 of the center differential device 10 is provided in a degree corresponding to the degree of squeezing together of said two sets of clutch plates, i.e. in a degree corresponding to the total force acting to squeeze the sandwich of said sets of clutch plates together.

The servo device 35 provided for thus pressing and squeezing together said sets of clutch plates comprises a pressure chamber 36 and a servo piston 37, all of these members and chambers being annular although only a partial sectional view thereof is shown in the figure. The servo piston 37 confronts the two sandwiched together sets of clutch plates, for opposing said clutch plate sets and for pressing them together, when said servo piston 37 is biased in the direction towards said clutch plate sets (rightwards in FIG. 2). And, when the pressure chamber 36 is pressurized with hydraulic fluid, it presses the servo piston 37 against the clutch plate sets 66 and 68 in this way, and squeezes them together. A spring 38, which in fact is an annular spring and which bears against a spring retainer member, is provided for biasing said servo piston 37 in the leftwards direction as seen in FIG. 2, so as to reduce the volume of the pressure chamber 36. Thereby, when no substantial hydraulic fluid pressure is supplied to said pressure chamber 36, under the biasing action of the spring 38 the servo piston 37 is biased in the leftwards direction as seen in the drawing, so as not to substantially compress the superposed sandwich of the clutch plate sets and so as thus to let said clutch plate sets be not substantially mutually engaged; and, thereby, no substantial degree of torque transmission between the sun gear 13 and the ring gear 14 of the center differential device 10 is provided. On the other hand, when a substantial degree of hydraulic fluid pressure is supplied to the pressure chamber 36, the servo piston 37 is biased, against the biasing action of the spring 38 which is overcome, in the rightwards direction as seen in the drawing, so that said servo piston 37 presses against and compresses together the superposed sandwich of the clutch plate sets with a force determined according to the magnitude of the pressure value supplied to said pressure chamber 36, thereby causing said clutch plate sets to be mutually engaged together with a maximum torque transmission capability which is determined according to said magnitude of said pressure value supplied to said pressure chamber 36; and, thereby, a maximum torque transmission capability is provided between the sun gear 13 and the ring gear 14 of the center differential device 10, similarly with a maximum torque transmission magnitude determined according to the magnitude of the pressure value supplied to the pressure chamber 36.

The electrically actuated electric/hydraulic control device 22, to define its action in a functional sense, supplies a hydraulic fluid pressure of any desired pressure level from substantially zero up to line pressure to the pressure chamber 36 of this servo device 35, according to the value of an electrical control signal supplied to it; this electric signal may be a pulse signal, and the duty ratio of said pulse signal may control the pressure supplied said pressure chamber 36 of the servo device 35, for example. Thus, by varying the pressure value represented by said electrical signal, it is possible to vary the degree of torque transmission between the sun gear 13 and the ring gear 14 of the center differential device 10 between substantially zero and a substantially maximum value. In the suggested exemplary construction shown in FIG. 2, the electrically actuated electric/hydraulic control device 22 comprises an electromagnetically actuated hydraulic switching valve 41, which receives supply at its port designated in the figure as "b" of hydraulic fluid pressurized by a pressure pump 39 (incorporated in the automatic transmission 2) and pressure regulated by a pressure regulator valve 40 whose port designated in the figure as "a" is connected to the pressure chamber 36 of the servo device 35 for supplying pressurized hydraulic fluid to said pressure chamber 36 and whose port designated in the figure as "c" is connected to a drain. This electromagnetically actuated hydraulic switching valve 41 is so constituted that when actuating electrical energy is supplied to a solenoid or the like incorporated therein it communicates its port "a" to its port "b" while not communicating its port "c" to any other port; while, on the other hand, when no such actuating electrical energy is supplied to said solenoid or the like of said electromagnetically actuated hydraulic switching valve 41, said electromagnetically actuated hydraulic switching valve 41 communicates its port "a" to its port "c" while not communicating its port "b" to any other port. Thereby, by the electromagnetically actuated hydraulic switching valve 41 being supplied with a pulse type controlling electrical signal, said electromagnetically actuated hydraulic switching valve 41 supplies a pressure value to the pressure chamber 36 of the servo device 35 which is determined according to the duty ratio of said pulse electrical signal.

This controlling pulse electrical signal is supplied from a transmission control device 45, now to be explained.

The Transmission Control System

Referring to FIG. 1, it will be seen that the following detectors and sensors are provided to this system. A right rear wheel rotational speed sensor 46 detects a value representative of the rotational speed of the right rear vehicle wheel (not particularly shown) by measuring the rotational speed of a member rotationally coupled to a right rear wheel power output shaft (also not particularly shown) which drives said right rear vehicle wheel, or the like, and outputs an electrical signal representative thereof. A left rear wheel rotational speed sensor 47 detects a value representative of the rotational speed of the left rear vehicle wheel (not particularly shown) by measuring the rotational speed of a member rotationally coupled to a left rear wheel power output shaft (also not particularly shown) which drives said left rear vehicle wheel, or the like, and outputs an electrical signal representative thereof. A right front wheel rotational speed sensor 48 detects a value representative of the rotational speed of the right front vehicle wheel (not particularly shown) by measuring the rotational speed of a member rotationally coupled to a right front wheel power output shaft (also not particularly shown) which drives said right front vehicle wheel, or the like, and outputs and electrical signal representative thereof. And a left front wheel rotational speed sensor 49 detects a value representative of the rotational speed of the left front vehicle wheel (not particularly shown) by measuring the rotational speed of a member rotationally coupled to a left front wheel power output shaft (also not particularly shown) which drives said left front vehicle wheel, or the like, and outputs an electrical signal representative thereof. A throttle position sensor 50 detects a value representative of the current load on the internal combustion engine 1 by measuring the opening angle (which will be referred to hereinafter as "theta") of the throttle valve (not particularly shown) of a carburetor (not shown either) of said engine 1, and outputs an electrical signal representative thereof. A set range sensor 51 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. An input torque sensor 52 detects a value representative of the torque which is being input to the four wheel drive power transfer device 3 from the gear transmission mechanism 7 of the automatic speed change device 2, and outputs an electrical signal representative thereof. And a manual changeover switch 53 outputs an electrical signal representative of its set position; this manual changeover switch 53 is manually set by the driver of the vehicle to one or another of two positions, for, as will be explained hereinafter, indicating whether or not the vehicle is to be operated in a mode in which the center differential device 10 of the four wheel drive power transfer device 3 is permanently locked up and is permanently prohibited from providing its differential action between the front vehicle wheels and the rear vehicle wheels. The output signals of these eight sensors and switches 46 through 53 are fed to a transmission control device 45.

This transmission control device 45 outputs control signals for controlling the electric/hydraulic control device 22 for the four wheel drive power transfer device 3 and for controlling the electric/hydraulic control mechanism 9 for the gear transmission mechanism 7, according to principles which incorporate the concept of the preferred embodiments of the vehicle four wheel drive front/rear coupling device control device and method of the present invention, as will be explained hereinafter. No concrete illustration of the structure of any particular realization of the transmission control device 45 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 45 is concretely realized as a micro computer and its associated circuitry, said micro computer operating at the behest of a control program which will not be completely detailed herein, since the details thereof which are not disclosed in this specification can likewise be easily supplemented by one of ordinary skill in the electronic and computer programming art based upon the functional disclosures set out herein. However, it should be particularly understood that such realizations in the micro computer form, although preferred, are not the only ways in which the transmission control device 45 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit; being joined together by a common bus which also links them to an input port and an output port which together perform input and output for the system. And the system will typically also include buffers for the electrical signals outputted from the various sensors and/or switches 46 through 53 to the input port device, and drive circuits through which actuating electrical signals are passed from the output port device to a speed change control solenoid or solenoids of the electrical/hydraulic control mechanism 9 for controlling the automatic speed change device 2 and to the solenoid or the like of the electromagnetically actuated hydraulic switching valve 41 of the electric/hydraulic control device 22 for controlling the torque transmission capacity of the clutch 21 of the four wheel drive power transfer device 3 by supplying appropriate hydraulic fluid pressure to the pressure chamber 36 of the servo mechanism 35. It should be understood that the transmission control device 45 generally functions so as to engage an appropriate one of the various speed stages of the gear transmission mechanism 7 of the transmission mechanism 2 according to the current values of various vehicle operating parameters such as the vehicle road speed sensors 46 through 49, the engine load (throttle opening theta) as sensed by the throttle position sensor 50, and the operating range of the transmission as manually set by the vehicle driver on the setting means therefor as sensed by the set range sensor 51; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the difference between the rotational speed of the rear wheels of the vehicle as detected by the sensors 46 and 47 therefor and the rotational speed of the front wheels of the vehicles as detected by the sensors 48 and 49 therefor, as well as, possibly, other operational parameters.

The Control According to the Preferred Method Embodiment

FIGS. 3 through 7 show in fragmentary form first through sixth portions of a flow chart for explaining the operation of a portion of the aforementioned control program which directs the operation of the transmission control device 45, according to this preferred embodiment of the vehicle four wheel drive front/rear coupling device control device of the present invention, so as to realize the preferred embodiment of the vehicle four wheel drive front/rear coupling device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow charts of FIGS. 3 through 7 only relate to the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only show this process in schematic form; said flow charts of FIGS. 3 through 7 therefore do not show any portion of said control program relating to the control provided for the gear transmission mechanism 7 of the transmission mechanism 2. These fragments will be sufficient for exemplifying the principles of the present invention. This program portion is executed at regular intervals of for example a few milliseconds, of course after the engine 1 is started as the vehicle incorporating it is driven. In this flow chart, the various sections thereof shown in the various FIGS. 3 through 7 are to be understood as linked together via the connecting points indicated as "A", "B", "C", and so on, this arrangement having being adopted only for convenience of arrangement of the illustrations.

Thus, after the START block, first in the decision step 100 the transmission control device 45 makes a decision as to whether or not the manual changeover switch 53 is currently set by the driver of the vehicle to its position for indicating operation of the vehicle with the center differential device 10 of the four wheel drive power transfer device 3 in the locked up condition, i.e. with the clutch 21 thereof in the fully engaged state. If the result of this decision is YES, so that said manual changeover switch 53 is in the center differential locked position, then the flow of control passes next to the decision step 101; but, if the result of this decision is NO, so that said manual changeover switch 53 is in the center differential non locked position, then the flow of control passes next to the step 116. And, in this step 116, the transmission control device 45 outputs a suitable pulsed electrical signal to the electric/hydraulic control device 22 for causing the clutch 21 of the center differential device 10 to be substantially completely released, and then the flow of control passes next to the END point of this FIG. 3 flow chart fragment, and the action of this portion of the program for the transmission control device 45 terminates without doing anything further. In this case, therefore, the vehicle is operated without any substantial locking action for the center differential device 10 of the four wheel drive power transfer device 3.

On the other hand, if the result of the step 100 decision is YES, then next in the decision step 101 the transmission control device 45 makes a decision as to whether or not all the four wheels of the vehicle are stationary together; this decision is made based upon the output signals from the rotational speed sensors 46 through 49 for the various vehicle wheels. If the result of this decision in NO, so that at least one of the vehicle wheels is currently rotating, then the flow of control passes next via the program point denoted as "A" to the flow chart portion shown in FIG. 4; but, if the result of this decision is YES, so that indeed all of the vehicle wheels are currently stationary, then the flow of control passes next to the step 102.

In this step 102, the transmission control device 45 starts the engagement of the clutch 21 of the center differential device 10, and then the flow of control passes next to the next decision step 103. It will be understood that this clutch 21 takes some considerable time, on the scale of the flow of these flow charts, to become engaged.

In this next decision step 103, the transmission control device 45 makes a decision as to whether or not a determinate time period has elapsed since the start of engagement of the clutch 21 as initiated by the step 102 during a previous iteration of this program portion; the appropriate value for this time period should typically be determined by experiment, according to the particular engagement characteristics of the physical realization of the clutch 21, the electric/hydraulic control device 22 therefor, and so on. If the result of this decision is YES, so that the determinate time period has now elapsed since the start of engagement of the clutch 21, then the flow of control passes next of the decision step 106; but, if the result of this decision in NO, so that as yet the determinate time period has not elapsed since the start of engagement of the clutch 21, then the flow of control passes next to the decision step 104.

In this next decision step 104, the transmission control device 45 again, similarly to what was done in the decision step 101, makes a decision as to whether or not all the four wheels of the vehicle are still stationary together; again, this decision is made based upon the output signals from the rotational speed sensors 46 through 49 for the various vehicle wheels. If the result of this decision is NO, so that at least one of the vehicle wheels is now currently rotating, then the flow of control passes next to the step 105; but, if the result of this decision is YES, so that indeed all of the vehicle wheels are still currently stationary, then the flow of control passes next back to the decision step 103 again, to repeat in a tight loop the tests performed in the decision steps 103 and 104. This continues until either the determinate time period elapses while the vehicle wheels have all remained stationary througout this time period and the clutch 21 has definitely completed its engagement, in which case the flow of control passes eventually out of this tight loop to the decision step 106, or until one of the vehicle wheels starts to rotate before the completion of the determinate time period, i.e. before the full engagement of the clutch 21, and then in this case the flow of control passes next to the step 105. In this step 105, the transmission control device 45 abandons the process of engaging the clutch and instead releases it, and then the flow of control passes next to the END point of this FIG. 3 flow chart fragment, and the action of this portion of the program for the transmission control device 45 terminates without doing anything further.

On the other hand, if all of the four vehicle wheels have all remained stationary throughout the determinate time period, then at the end of said determinate time period the flow of control passes to the decision step 106. In this decision step 106, the transmission control device 45 makes a decision as to whether or not the N range or the P range of the automatic speed change device 2, i.e. a non driving range thereof, is currently being set by the driver of the vehicle and is being registered on the set range sensor 51. If the result of this decision is YES, so that indeed a non driving range of the automatic speed change device 2 is currently being set by the vehicle driver, then the flow of control passes next to the decision step 112; but, if the result of this decision is NO, so that in fact currently a driving range of the automatic speed change device 2 is being set by the vehicle driver, then the flow of control passes next to the decision step 107. If the range of the automatic speed change device 2 is in fact a non driving range, and accordingly the vehicle is stationary because of lack of drive, then in the step 112 the transmission control device 45 makes a decision as to whether or not the engagement of the clutch 21 is complete. If the result of this decision is YES, so that indeed the engagement of the clutch 21 is complete, and accordingly the vehicle is stationary perhaps because of a stall situation, then the flow of control passes next to the END point of this program fragment, without doing anything further; but, if the result of this decision is NO, so that the engagement of the clutch 21 is not yet complete, then the flow of control passes next back to the decision step 106 again, to cycle around in a loop. This decision as to whether or not the engagement of the clutch 21 is yet complete may be made by any one of the following methods: determining whether or not the hydraulic pressure within the pressure chamber 36 of the servo device 35 has reached a certain determinate value; determining whether or not the servo piston 37 of said servo device 35 has reached a certain determinate position; or determining whether or not a certain determinate time period has elapsed since the start of the engagement process for said clutch 21.

On the other hand, in the decision step 107 which is reached as explained above if currently a driving range of the automatic speed change device 2 is being set by the vehicle driver, then the transmission control device 45 makes a decision as to whether or not the gear transmission mechanism 7 of said automatic speed change device 2 is currently set to the first (forward) speed stage thereof. If the result of this decision is YES, so that said gear transmission mechanism 7 is indeed currently set to its first speed stage, then the flow of control passes next to the step 108 in the block outlined in FIG. 3 by a dash dotted line and denoted as "alpha", which as will be explained shortly relate to certain values of certain determinate constants denoted as "deltaNset", "thetaset", and "Tiset"; but, if the result of this decision is NO, so that said gear transmission mechanism 7 is not currently set to its first speed stage, then the flow of control passes next to the decision step 113. Similarly, in this decision step 113, the transmission control device 45 makes a decision as to whether or not the gear transmission mechanism 7 of said automatic speed change device 2 is currently set to the second (forward) speed stage thereof. If the result of this decision is YES, so that said gear transmission mechanism 7 is indeed currently set to its second speed stage, then the flow of control passes next to a set of steps analogous to those shown in the block "alpha", but however with different values for the constants "deltaNset", "thetatset", and "Tiset"; but, if the result of this decision is NO, so that said gear transmission mechanism 7 is not currently set to its first or its second speed stage, then the flow of control passes next to the decision step 114. Similarly, in this decision step 114, the transmission control device 45 makes a decision as to whether or not the gear transmission mechanism 7 of said automatic speed change device 2 is currently set to the third (forward) speed stage thereof. If the result of this decision is YES, so that said gear transmission mechanism 7 is indeed currently set to its third speed stage, then the flow of control passes next to another set of analogous to those shown in the block "alpha", but however with yet further different values for the constants "deltaNset", "thetatset", and "Tiset"; but, if the result of this decision is NO, so that said gear transmission mechanism 7 is not currently set to its first, its second, or its third speed stage, then the flow of control passes next to the decision step 115. And, again similarly, in this decision step 115, the transmission control device 45 makes a decision as to whether or not the gear transmission mechanism 7 of said automatic speed change device 2 is currently set to the fourth (forward) speed stage thereof. If the result of this decision is YES, so that said gear transmission mechanism 7 is indeed currently set to its fourth speed stage, then the flow of control passes next to yet another set of steps analogous to those shown in the block "alpah", but however with yet further different values for the constants "deltaNset", "thetaset", and "Tiset"; but, if the result of this decision is NO, so that said gear transmission mechanism 7 is not currently set to its first, its second, its third, or its fourth speed stage, and accordingly said gear transmission mechanism 7 must be set to its reverse speed stage, then again the flow of control passes next to yet another set of steps analogous to those shown in the block "alpha", but however with yet further different values for the constants "deltaNset", "thetatset", and "Tiset".

To consider as an example the case wherein the result of the decision in the step 107 is YES, so that the gear transmission mechanism 7 is indeed currently set to its first speed stage, and in which case the flow of control passes next to the decision step 108 in the block "alpha".

Figure 3:
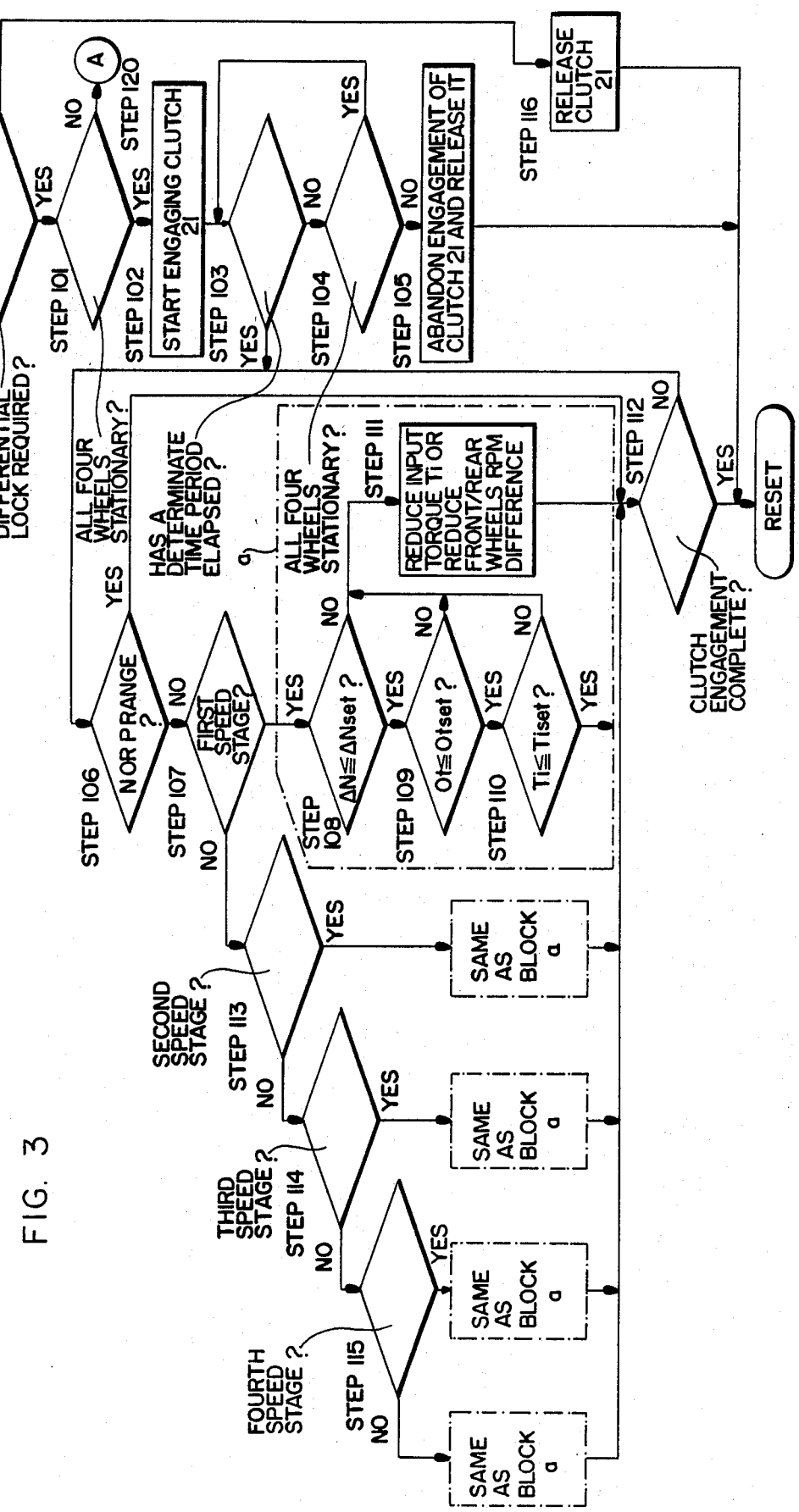
FIG. 3 is a first portion of a fragmentary flow chart for showing the operation of this preferred method embodiment, illustrating the flow of a program portion which is obeyed by a transmission control device which is shown by a block in FIG. 1 and is included in this preferred device embodiment, and (in one of its branches) leading from a start point of said program portion to a program point denoted as "A"

At this point in the flow chart of FIG. 3, this block "alpha" determines, when changing over from the state in which the clutch 21 is released to the state in which said clutch 21 is engaged, for example when starting off relatively abruptly on a road surface of relatively low coefficient of friction, whether the difference between the rotational speed of the rear wheels of the vehicle as detected by the sensors 46 and 47 therefor and the rotational speed of the front wheels of the vehicle as detected by the sensors 48 and 49 therefor is relatively high, or the output of the engine 1 is relatively high, or the torque being inputted to the four wheel drive power transfer device 3 is relatively high; and if any of these three conditions is met said difference between the rotational speed of the rear wheels of the vehicle and the rotational speed of the front wheels of the vehicle is reduced by one means or another. Thus, in the first decision step 108 of this block "alpha", the transmission control device 45 makes a decision as to whether or not the difference deltaN between the rotational speed of the rear wheels of the vehicle and the rotational speed of the front wheels of the vehicle is less than or equal to a determinate value deltaNset. If the result of this decision is YES, so that actually deltaN is less than or equal to deltaNset, then the flow of control passes next to the next decision step 109; but, if the result of this decision is NO, so that in fact deltaN is greater than this determinate threshold value deltaNset, then the flow of control passes next to the step 111. And, in the decision step 109, the transmission control device 45 makes a decision as to whether or not the value thetat of the throttle opening theta of the engine 1 is less than or equal to a determinate value thetatset. If the result of this decision is YES, so that in fact thetat is less than or equal to thetaset, then the flow of control passes next to the next decision step 110; but, if the result of this decision is NO, so that in fact thetat is greater than this determinate value thetatset, then the flow of control passes next to the step 111. And, in the decision step 110, the transmission control device 45 makes a decision as to whether or not the torque Ti which is being inputted to the four wheel drive power transfer device 3 is less than or equal to a determinate value Tiset. If the result of this decision is YES, so that in fact Ti is less than or equal to Tiset, then the flow of control passes next out of this block "alpha" to the decision step 112; but, if the result of this decision is NO, so that in fact Ti is greater than this determinate value Tiset, then again the flow of control passes next to the step 111. And, in this step 111, a form of control is performed which reduces the difference between the rotational speed of the rear wheels of the vehicle as detected by the sensors 46 and 47 therefor and the rotational speed of the front wheels of the vehicle as detected by the sensors 48 and 49 therefor: this control may be provided by reducing the amount of fuel injection to the internal combustion engine 1 via the engine control device 55 and/or by delaying the ignition timing of said internal combustion engine 1, or in some other manner such as by reducing the torque Ti which is being inputted to the four wheel drive power transfer device 3 by upshifting the gear transmission mechanism 7 of the automatic speed change device 2. Thus, it is avoided that large absorption of energy should be required to be provided by the clutch 21 during its engagement, and therby the operational lifetime of said clutch 21 is prolonged.

Thus, in this preferred embodiment, the input torque reduction or other method of reducing the difference between the rotational speed of the rear wheels of the vehicle and the rotational speed of the front wheels of the vehicle is performed in the three following cases: if the value of deltaN, the difference between the rotational speed of the rear wheels of the vehicle as detected by the sensors 46 and 47 therefor and the rotational speed of the front wheels of the vehicle as detected by the sensors 48 and 49 therefor, exceeds the determinate value deltaNset; if the value thetat of the throttle opening theta of the engine 1, as detected from the output signal of the throttle position sensor 50, exceeds the determinate value thetatset; and if the value of the torque Ti which is being inputted to the four wheel drive power transfer device 3, as detected from the output signal of the input torque sensor 52, exceeds the determinate value Tiset. After this rotational speed difference reduction performed in the step 111, or directly if none of these three threshold conditions applies so that there is no problem of clutch durability at this time, the flow of control passes to the decision step 112, in which the transmission control device 45 makes a decision as to whether or not the engagement of the clutch 21 has been completed; if the result of this decision is YES, so that the engagement of the clutch 21 has now been completed, then the flow of control passes next to exit this program fragment, without doing anything further; but, if the result of this decision is NO, so that the engagement of the clutch 21 is not yet completed, then the flow of control passes next back to the decision step 106 again, to cycle around in a loop repeatedly testing the conditions of the decision steps 108, 109, and 110 until clutch engagement is in fact completed.

As for the other versions of the flow chart portion indicated by the box "alpha" that are performed at the YES branches from the decision steps 113, 114, and 115, and at the NO branch from said decision step 115 also, these versions are similar to the one described above, except that different values are utilized for the threshold values deltaNset, thetatset, and Tiset. The values of these various threshold values are set the lower, the lower is the speed stage of the gear transmission mechanism 7, in other words the greater is the speed change ratio provided thereby.

Figure 4:
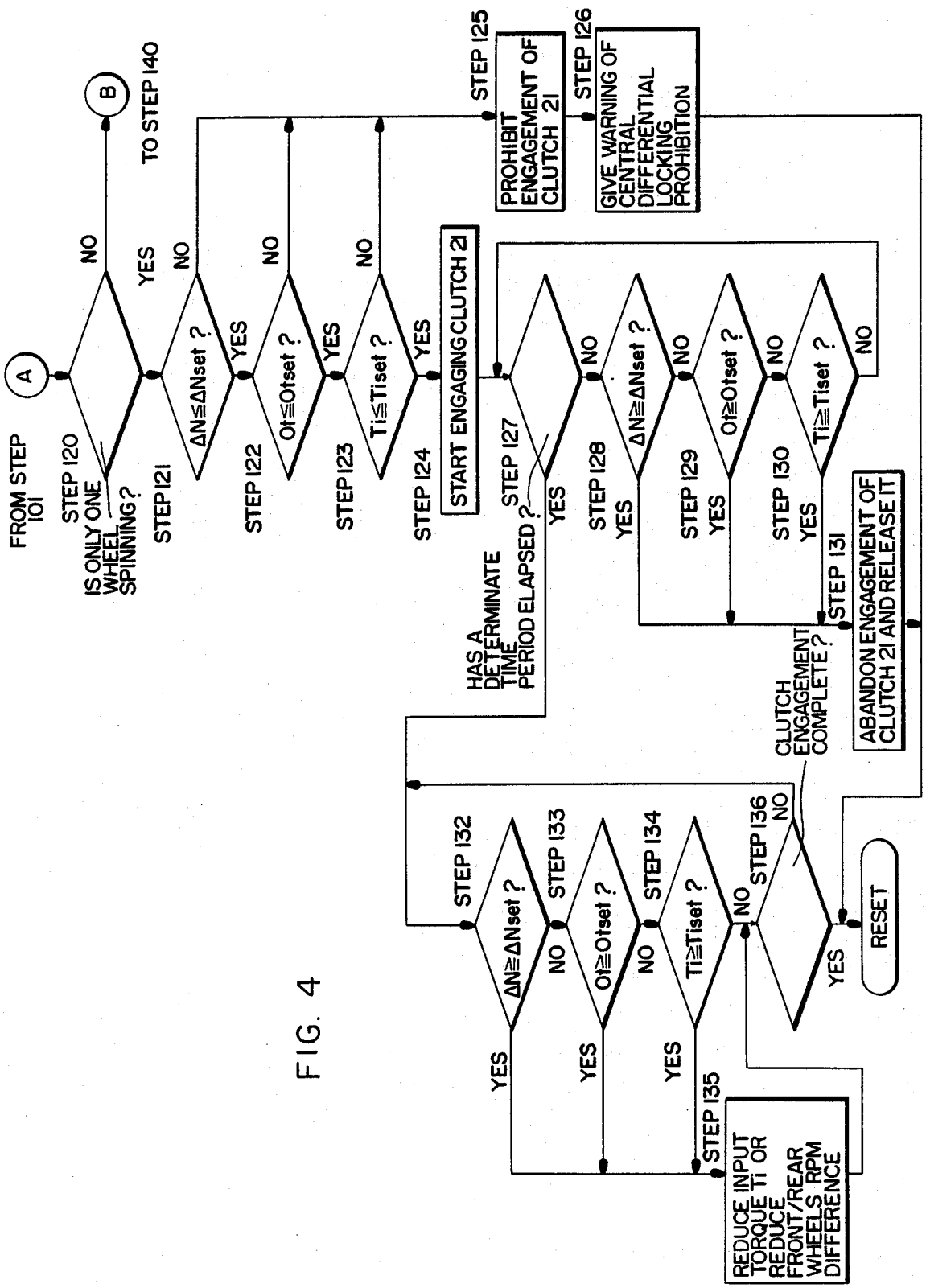
FIG. 4 is a second portion of said fragmentary flow chart for showing the operation of this preferred method embodiment, (in one of its branches) leading from said program point "A" shown in the FIG. 3 flow chart to a program point denoted in this figure as "B"

On the other hand, when the decision in the decision step 101 is a NO decision, in other words when it is not the case that all of the four vehicle wheels are stationary, then the flow of control passes, via the program point designated as "A", to the program portion whose partial flow chart is shown in FIG. 4, and particularly to the decision step 120 thereof. In this next decision step 120, the transmission control device 45 makes a decision as to whether or not it is the case that only one of the four vehicle wheels is spinning. If the result of this decision is YES, so that indeed only one of the four vehicle wheels is spinning, then the flow of control passes next to the decision step 121; but, if the result of this decision is NO, so that it is not the case that only one of the four vehicle wheels is spinning, then this partial flow chart portion is not applicable, and the flow of control passes next via the program point designated as "B" to the decision step 140 of the next program portion whose partial flow chart is shown in FIG. 5.

On the other hand, if it has been determined that only one of the four vehicle wheels is spinning-which is the case if, for example, said one vehicle wheel has fallen into a wet hole or the like and has lost its grip, and there is relative rotation between said spinning wheel and the other substantially stationary wheels, and in which case the power on state is determined upon in order to try to escape from such a wet hole-then, in this case, if the center differential device 10 of the four wheel drive power transfer device 3 is in the locked up operational condition, the vehicle is in a drive state in which four vehicle wheels are directly coupled, or is in a drive state similar to such a state, and accordingly the vehicle can get out of the wet hole quickly. However, if the operational condition of the vehicle transits from an operational state in which the difference deltaN between the rotational speed of the rear wheels of the vehicle and the rotational speed of the front wheels of the vehicle is relatively large to an operational state in which the clutch 21 of the center differential device 10 is fully engaged, then the kinetic energy of rotation of the one of the vehicle wheels which is spinning relatively freely in the wet hole will be required to be absorbed by the lining material of said clutch 21, and accordingly said lining material will be excessively worn, and the durability of the clutch will be severely deteriorated. Thus, in order to escape from the wet hole in this state, the clutch 21 is engaged when the difference between the rotational speed of the rear wheels of the vehicle and the rotational speed of the front wheels of the vehicle is not too great, and after this engagement process is completed the accelerator pedal of the vehicle may be depressed in order to increase engine power output and thus to get the vehicle out of the wet hole by providing a substantial locking up effect for the center differential device 10.

Therefore, in this next decision step 121, the transmission control device 45 makes a decision as to whether or not the difference deltaN between the rotational speed of the rear wheels of the vehicle and the rotational speed of the front wheels of the vehicle is less than or equal to a determinate value deltaNset. If the result of this decision is YES, so that actually deltaN is less than or equal to deltaNset, then the flow of control passes next to the next decision step 122; but, if the result of this decision is NO, so that in fact deltaN is greater than this determinate threshold value deltaNset, then the flow of control passes next to the step 125. And, in the decision step 122, the transmission control device 45 makes a decision as to whether or not the value thetat of the throttle opening theta of the engine 1 is less than or equal to a determinate value thetatset. If the result of this decision is YES, so that in fact thetat is less than or equal to thetatset, then the flow of control passes next to the next decision step 123; but, if the result of this decision is NO, so that in fact thetat is greater than this determinate value thetatset, then the flow of control passes next to the step 125. And, in the decision step 123, the transmission control device 45 makes a decision as to whether or not the torque Ti which is being inputted to the four wheel drive power transfer device 3 is less than or equal to a determinate value Tiset. If the result of this decision is YES, so that in fact Ti is less than or equal to Tiset, then the flow of control passes next to the step 124; but, if the result of this decision is NO, so that in fact Ti is greater than this determinate value Tiset, then again the flow of control passes next to the step 125. And, in this step 125, the engagement of the clutch 21 of the center differential device 10 of the four wheel drive power transfer device 3 is prohibited, for the reasons described above, in order to ensure that the durability of said clutch 21 should be preserved. Thus, it is avoided that large absorption of energy should be required to be provided by the clutch 21 during its engagement, and thereby the operational lifetime of said clutch 21 is prolonged. Then the flow of control passes next to the step 126, in which a visible or audible warning is given to the driver of the vehicle, by means of a warning device not particularly shown in the figures, in order to apprise him or her of the fact that, against his or her wishes, the center differential device 10 is not in the locked up state. Optionally, a warning may also be given as to why this state of affairs has transpired. This warning device may be implemented as a flashing light, a character display, a speech warning, a buzzer or tone warning, or the like.

The value of deltaNset utilized in this decision step 121 is typically a different value from that utilized in the decision step 108 described above; and this value may be a predetermined and fixed constant value, but alternatively it may be set variably according to the value of the torque Ti which is being inputted to the four wheel drive power transfer device 3, or according to the power output of the engine 1, or according to the speed stage of the gear transmission mechanism 7 of the automatic speed change device 2 which is currently engaged. In such cases, the value of deltaNset should be set the lower, the higher is the input torque Ti, or the higher is the engine power output, or the lower is the engaged speed stage of the gear transmission mechanism 7.

Thus, in these preferred embodiments of the vehicle four wheel drive front/rear coupling device control device and method of the present invention, the engagement of the clutch 21 of the center differential device 10 is prohibited, not only when the difference between the rotational speed of the rear wheels of the vehicle and the rotational speed of the front wheels of the vehicle is greater than a determinate value, but also when the engine load exceeds a determinate value, and when the torque which is being inputted to the four wheel drive power transfer device 3 exceeds a determinate value.

On the other hand, if all the tests in the decision steps 121, 122, and 123 produce YES results, then there is no substantial problem with durability of the clutch 21, and, in the step 124, the transmission control device 45 starts the engagement of the clutch 21 of the center differential device 10, and then the flow of control passes next to the next decision step 127. In this decision step 127, the transmission control device 45 makes a decision as to whether or not a determinate time period has elapsed. If the result of this decision is YES, so that indeed said determinate time period has elapsed, then the flow of control passes next to the decision step 132; but, if the result of this decision is NO, so that in fact said determinate time period has not yet elapsed, then the flow of control passes next to the decision step 128. In the next three decision steps 128, 129, and 130, corresponding tests are carried out to those performed in the decision steps 121, 122, and 123: in the decision step 128, the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is NO, so that actually deltaN is less than or equal to deltaNset, then the flow of control passes next to the next decision step 129; but, if the result of this decision is YES, so that in fact deltaN is greater than this determinate threshold value deltaNset, then the flow of control passes next to the step 131.

And, in the next decision step 129, the transmission control device 45 makes a decision as to whether or not the value thetat of the throttle opening theta of the engine 1 is greater than or equal to a determinate value thetatset. If the result of this decision is NO, so that in fact thetat is less than or equal to thetatset, then the flow of control passes next to the next decision step 130; but, if the result of this decision is YES, so that in fact thetat is greater than this determinate value thetatset, then the flow of control passes next to the step 131. And, in the next decision step 130, the transmission control device 45 makes a decision as to whether or not the torque Ti which is being inputted to the four wheel drive power transfer device 3 is greater than or equal to a determinate value Tiset. If the result of this decision is YES, so that in fact Ti is greater than or equal to Tiset, then the flow of control passes next to the step 131; but, if the result of this decision is NO, so that in fact Ti is less than this determinate value Tiset, then the flow of control passes next back to the decision step 127 again, to cycle around in a tight loop, until the determinate time period specified in said decision step 127 in fact has elapsed. This determinate time period is determined to be the approximate characteristic time period from the time point at which the clutch 21 starts to be engaged from the disengaged condition, to the time point at which said clutch 21 actually starts to transmit torque to a significant or substantial extent.

However, in the step 131, which is reached as explained above if the result of any of the tests in the decision steps 128, 129, and 130 becomes YES during the passing of said determinate time period up until initial engagement of clutch 21 as specified in the decision step 127, the transmission control device 45 abandons the process of engaging the clutch 21 and instead releases it, and then the flow of control passes next to the END point of this FIG. 4 flow chart fragment, and the action of this portion of the program for the transmission control device 45 terminates without doing anything further.

If, however, the decision step 132 is reached, then the determinate time period of the step 127 has elapsed without any of the conditions in the decision steps 128, 129, and 130 producing a YES result, and then a similar processing to that which was done in the block "alpha" of FIG. 3 is performed—in detail, it is determined whether the difference between the rotational speed of the rear wheels of the vehicle as detected by the sensors 46 and 47 therefor and the rotational speed of the front wheels of the vehicle as detected by the sensors 48 and 49 therefor is relatively high, or the output of the engine 1 is relatively high, or the torque being inputted to the four wheel drive power transfer device 3 is relatively high; and if any of these three conditions is met said difference between the rotational speed of the rear wheels of the vehicle and the rotational speed of the front wheels of the vehicle is reduced by one means or another. Thus, in the first decision step 132, the transmission control device 45 makes a decision as to whether or not the difference deltaN between the rotational speed of the rear wheels of the vehicle and the rotational speed of the front wheels of the vehicle is greater than or equal to a determine value deltaNset. If the result of this decision is NO, so that actually deltaN is less than deltaNset, then the flow of control passes next to the next decision step 133; but, if the result of this decision is YES, so that in fact deltaN is greater than or equal to this determinate threshold value deltaNset, then the flow of control passes next to the step 135. And, in the decision step 133, the transmission control device 45 makes a decision as to whether or not the value thetat of the throttle opening theta of the engine 1 is greater than or equal to a determinate value thetatset. If the result of this decision is NO, so that in fact thetat is less than thetatset, then the flow of control passes next to the next decision step 134; but, if the result of this decision is YES, so that in fact thetat is greater than or equal to this determinate value thetatset, then the flow of control passes next to the step 135. And, in the decision step 134, the transmission control device 45 makes a decision as to whether or not the torque Ti which is being inputted to the four wheel drive power transfer device 3 is greater than or equal to a determinate value Tiset. If the result of this decision is NO, so that in fact Ti is less than Tiset, then the flow of control passes next to the decision step 136; but, if the result of this decision is NO, so that in fact Ti is greater than or equal to this determinate value Tiset, then again the flow of control passes next to the step 135. And, in the decision step 136, the transmission control device 45 makes a decision as to whether or not the engagement of the clutch 21 has been completed; if the result of this decision is YES, so that the engagement of the clutch 21 has now been completed, then the flow of control passes next to exit this program fragment, without doing anything further; but, if the result of this decision is NO, so that the engagement of the clutch 21 is not yet completed, then the flow of control passes next back to the decision step 132 again, to cycle around in a loop repeatedly testing the conditions of the decision steps 132, 133, and 134 until clutch engagement is in fact completed.

On the other hand, in the step 135, a form of control is performed which reduces the difference between the rotational speed of the rear wheels of the vehicle as detected by the sensors 46 and 47 therefor and the rotational speed of the front wheels of the vehicle as detected by the sensors 48 and 49 therefor: this control may be provided by reducing the amount of fuel injection to the internal combustion engine 1 via the engine control device 55 and/or by delaying the ignition timing of said internal combustion engine 1, or in some other manner such as by reducing the torque Ti which is being inputted to the four wheel drive power transfer device 3 by upshifting the gear transmission mechanism 7 of the automatic speed change device 2. Thus, it is avoided that large absorption of energy should be required to be provided by the clutch 21 during its engagement, and thereby the operational lifetime of said clutch 21 is prolonged. Thereby, without releasing the clutch 21, after the state of substantial torque transmission has been reached, the amount of energy which is required to be absorbed by said clutch 21 is in the step 135, suitably limited. After this rotational speed difference reduction has been performed, the flow of control, as before, passes to the decision step 136.

Figure 6A:
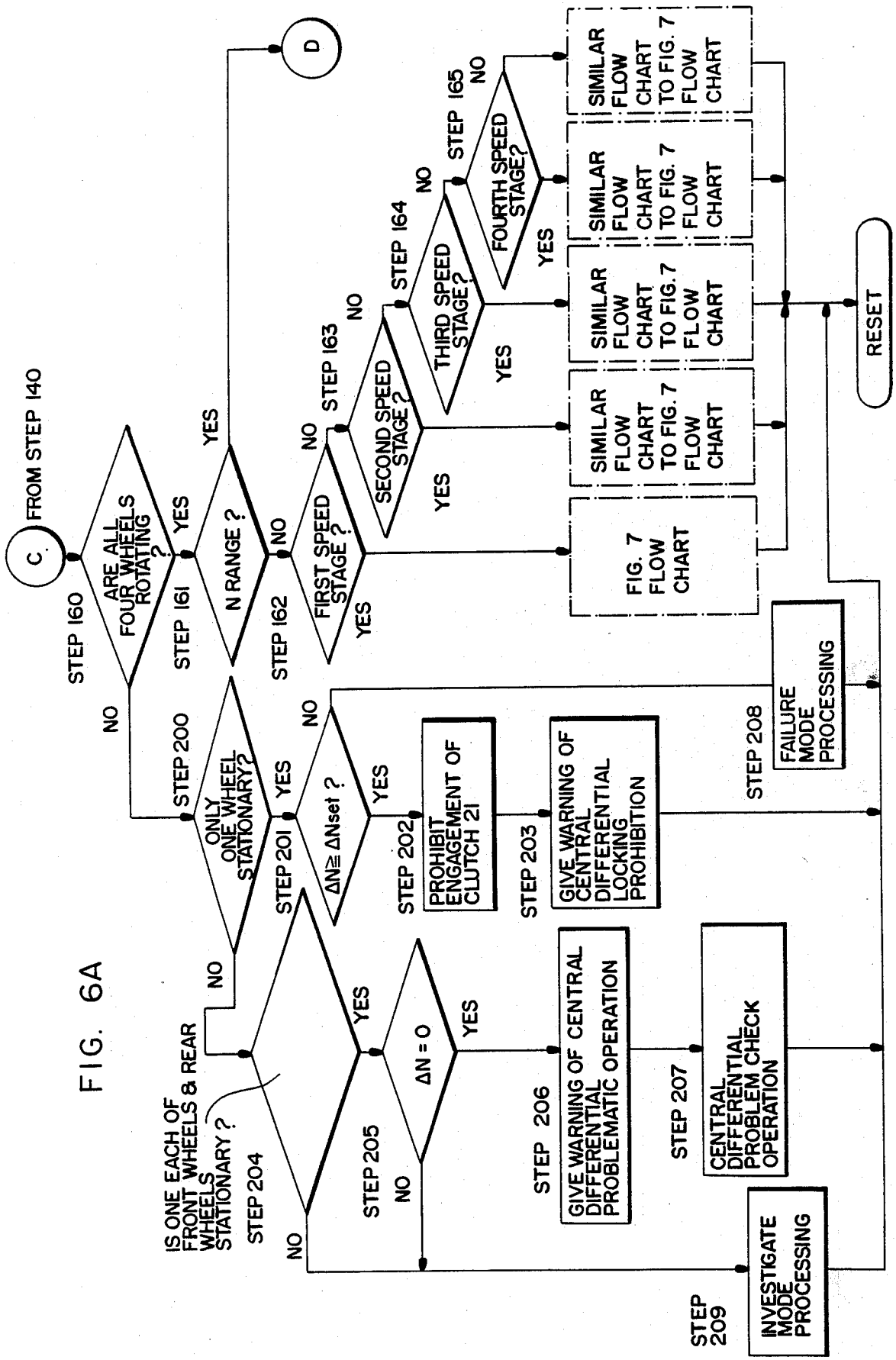
FIG. 6A is a fourth portion of said fragmentary flow chart for showing the operation of this preferred method embodiment, (in one of its branches) leading from said program point "C" shown in the FIG. 5 flow chart to a program point denoted in this figure as "D"

On the other hand, when the decision in the decision step 120 is a NO decision, in other words when it is not the case that only one of the four vehicle wheels is spinning, then the flow of control passes, via the program point designated as "B", to the program portion whose partial flow chart is shown in FIG. 5, and particularly to the decision step 140 thereof. In this next decision step 140, the transmission control device 45 makes a decision as to whether or not it is the case either that both of the two front vehicle wheels are stationary or that both of the two rear vehicle wheels are stationary. If the result of this decision is YES, so that indeed both of the two front vehicle wheels are stationary or both of the two rear vehicle wheels are stationary, then the flow of control passes next to the decision step 141; but, if the result of this decision is NO, so that it is not the case that both of the two front vehicle wheels are stationary and also it is not the case that both of the two rear vehicle wheels are stationary, then this partial flow chart portion is not applicable, and the flow of control passes next via the program point designated as "C" to the decision step 140 of the next program portion whose partial flow chart is shown in FIG. 6A.

On the other hand, if it has been determined that both of the two front vehicle wheels are stationary or both of the two rear vehicle wheels are stationary—which is the case if, for example, the parking brake of the vehicle has been left on and is locking one of said pairs of vehicle wheels, or, for example, if one of said pairs of vehicle wheels is stuck in a transverse trench across the road surface and accordingly the vehicle is desired to be extracted from this predicament—then, in this case, in the next decision step 141, the transmission control device 45 makes a decision as to whether or not the parking brake of the vehicle is OFF. If the result of this decision is YES, so that indeed the parking brake of the vehicle is in the OFF condition, then the flow of control passes next to the next decision step 142; but, if the result of this decision is NO, so that the parking brake of the vehicle is not OFF, i.e. is ON, then the wish of the driver of the vehicle, for some reason, to remain stationary should override all other considerations, and accordingly the flow of control passes next to the step 146.

Next, in the next decision step 142, the transmission control device 45 makes a decision as to whether or not the difference deltaN between the rotational speed of the rear wheels of the vehicle and the rotational speed of the front wheels of the vehicle is less than or equal to a determinate value deltaNset. If the result of this decision is YES, so that actually deltaN is less than or equal to deltaNset, then the flow of contol passes next to the next decision step 143; but, if the result of this decision is NO, so that in fact deltaN is greater than this determinate threshold value deltaNset, then the flow of control passes next to the step 146. And, in the decision step 143, the transmission control device 45 makes a decision as to whether or not the value thetat of the throttle opening theta of the engine 1 is less than or equal to a determinate value thetatset. If the result of this decision is YES, so that in fact thetat is less than or equal to thetatset, then the flow of control passes next to the next decision step 144; but, if the result of this decision is NO, so that in fact thetat is greater than this determinate value thetatset, then the flow of control passes next to the step 146. And, in the decision step 144, the transmission control device 45 makes a decision as to whether or not the torque Ti which is being inputted to the four wheel drive power transfer device 3 is less than or equal to a determinate value Tiset. If the result of this decision is YES, so that in fact Ti is less than or equal to Tiset, then the flow of control passes next to the step 145; but, if the result of this decision is NO, so that in fact Ti is greater than this determinate value Tiset, then again the flow of control passes next to the step 146. And, in this step 146, the engagement of the clutch 21 of the center differential device 10 of the four wheel drive power transfer device 3 is prohibited, for the reasons described above, in order to ensure that the durability of said clutch 21 should be preserved. Thus, it is avoided that large absorption of energy should be required to provided by the clutch 21 during its engagement, and thereby the operational lifetime of said clutch 21 is prolonged. Then the flow of control passes next to the step 147, in which a visible or audible warning is given to the driver of the vehicle, again by means of a warning device not particularly shown in the figures, in order to apprise him or her of the fact that, against his or her wishes, the center differential device 10 is not in the locked up state. Optionally, a warning may also be given as to why this state of affairs has transpired. Again, this warning device may be implemented as a flashing light, a character display, a speech warning, a buzzer or tone warning, or the like.

The value of deltaNset utilized in this decision step 142 is typically a different value from those utilized in the decision steps 121 and 108 described above; and, as before, this value may be a predetermined and fixed constant value, or alternatively it may be set variably according to the value of the torque Ti which is being inputted to the four wheel drive power transfer device 3, or according to the power output of the engine 1, or according to the speed stage of the gear transmission mechanism 7 of the automatic speed change device 2 which is currently engaged. In such cases, the value of deltaNset should be set the lower, the higher is the input torque Ti, or the higher is the engine power output, or the lower is the engaged speed stage of the gear transmission mechanism 7. And, mutatis mutandis, the values of the threshold values thetatset and Tiset could also be made variable, depending upon the particular application.

On the other hand, if all the tests in the decision steps 142, 143, and 144 produce YES results, then there is no substantial problem with durability of the clutch 21, and, in the step 145, the transmission control device 45 starts the engagement of the clutch 21 of the center differential device 10, and then the flow of control passes next to the next decision step 148. In this decision step 148, the transmission control device 45 makes a decision as to whether or not a determinate time period has elapsed. If the result of this decision is YES, so that indeed said determinate time period has elapsed, then the flow of control passes next to the decision step 154; but, if the result of this decision is NO, so that in fact said determinate time period has not yet elapsed, then the flow of control passes next to the decision step 149. In the next three decision steps 149, 150, 151, and 152, corresponding tests are carried out to those performed in the decision steps 141, 142, 143, and 144: in the decision step 149, the transmission control device 45 makes a decision as to whether or not the parking brake of the vehicle is in the ON condition. If the result of this decision is NO, so that actually the parking brake is Off, then the flow of control passes next to the next decision step 150; but, if the result of this decision is YES, so that in fact the parking brake is currently ON, the the flow of control passes next to the step 153. Next, in the decision step 150, the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is NO, so that actually deltaN is less than or equal to deltaNset, then the flow of control passes next to the next decision step 151; but, if the result of this decision is YES, so that in fact deltaN is greater than this determinate threshold value deltaNset, then the flow of control passes next to the step 153. And, in the next decision step 151, the transmission control device 45 makes a decision as to whether or not the value thetat of the throttle opening theta of the engine 1 is greater than or equal to a determinate value thetatset. If the result of this decision is NO, so that in fact thetat is less than or equal to thetatset, then the flow of control passes next to the next decision step 152; but, if the result of this decision is YES, so that in fact thetat is greater than this determinate value thetat set, then the flow of control passes next to the step 153. And, in the next decision step 152, the transmission control device 45 makes a decision as to whether or not the torque Ti which is being inputted to the four wheel drive power transfer device 3 is greater than or equal to a determinate value Tiset. If the result of this decision is YES, so that in fact Ti is greater than or equal to Tiset, then the flow of control passes next to the step 153; but, if the result of this decision is NO, so that in fact Ti is less than this determinate value Tiset, then the flow of control passes next back to the decision step 148 again, to cycle around in a tight loop, until the determinate time period specified in said decision step 148 in fact has elapsed, at which time the flow of control is transferred to the decision step 154. This determinate time period is again determined to be the approximate characteristic time period from the time point at which the clutch 21 starts to be engaged from the disengaged condition, to the time point at which said clutch 21 actually starts to transmit torque to a significant or substantial extent.

However, in the step 153, which is reached as explained above if the result of any of the tests in the decision steps 149, 150, 151, and 152 becomes YES during the passing of said determinate time period up until initial engagement of the clutch 21 as specified in the decision step 148, the transmission control device 45 abandons the process of engaging the clutch 21 and instead releases it, and then the flow of control passes next to the END point of this FIG. 4 flow chart fragment, and the action of this portion of the program for the transmission control device 45 terminates without doing anything further.

If, however, the decision step 154 is reached, then the determinate time period of the step 148 has elapsed without any of the conditions in the decision steps 149, 150, 151, and 152 ever producing a YES result, and then again a similar processing to that which was done in the block "alpha" of FIG. 3 is performed—in detail, it is determined whether the difference between the rotational speed of the rear wheels of the vehicle as detected by the sensors 46 and 47 therefor and the rotational speed of the front wheels of the vehicle as detected by the sensors 48 and 49 therefor is relatively high, or the output of the engine 1 is relatively high, or the torque being inputted to the four wheel drive power transfer device 3 is relatively high; and if any of these three conditions is met said difference between the rotational speed of the rear wheels of the vehicle and the rotational speed of the front wheels of the vehicle is reduced by one means or another. Thus, in the first decision step 154, the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is NO, so that actually deltaN is less than deltaNset, then the flow of control passes next to the next decision step 155; but, if the result of this decision is YES, so that in fact deltaN is greater than or equal to this determinate threshold value deltaNset, then the flow of control passes next to the step 157. And, in the decision step 155, the transmission control device 45 makes a decision as to whether or not the value thetat of the throttle opening theta of the engine 1 is greater than or equal to a determinate value thetatset. If the result of this decision is NO, so that in fact thetat is less than thetatset, then the flow of control passes next to the next decision step 156; but, if the result of this decision is YES, so that in fact thetat is greater than or equal to this determinate value thetatset, then the flow of control passes next to the step 157. And, in the decision step 156, the transmission control device 45 makes a decision as to whether or not the torque Ti which is being inputted to the four wheel drive power transfer device 3 is greater than or equal to a determinate value Tiset. If the result of this decision is NO, so that in fact Ti is less than Tiset, then the flow of control passes next to the decision step 158; but, if the result of this decision is NO, so that in fact Ti is greater than or equal to this determinate value Tiset, then again the flow of control passes next to the step 157. And, in the decision step 158, the transmission control device 45 makes a decision as to whether or not the engagement of the clutch 21 has been completed; if the result of this decision is YES, so that the engagement of the clutch 21 has now been completed, then the flow of control passes next to exit this program fragment, without doing anything further; but, if the result of this decision is NO, so that the engagement of the clutch 21 is not yet completed, then the flow of control passes next back to the decision step 154 again, to cycle around in a loop repeatedly testing the conditions of the decision steps 154, 155, and 156 until clutch engagement is in fact completed.

On the other hand, in the step 157, a form of control is performed which reduces the difference between the rotational speed of the rear wheels of the vehicle as detected by the sensors 46 and 47 therefor and the rotational speed of the front wheels of the vehicle as detected by the sensors 48 and 49 therefor: as before, this control may be provided by reducing the amount of fuel injection to the internal combustion engine 1 via the engine control device 55 and/or by delaying the ignition timing of said internal combustion engine 1, or in some other manner such as by reducing the torque Ti which is being inputted to the four wheel drive power transfer device 3 by upshifting the gear transmission mechanism 7 of the automatic speed change device 2. Thus, it is avoided that large absorption of energy should be required to be provided by the clutch 21 during its engagement, and thereby the operational lifetime of said clutch 21 is prolonged. Thereby, without releasing the clutch 21, after the state of substantial torque transmission has been reached, the amount of energy which is required to be absorbed by said clutch 21 is in the step 157, suitably limited. After this rotational speed difference reduction has been performed, the flow of control, as before, passes to the decision step 158.

In the decision steps 142 through 144, the decision steps 150 through 152, and the decision steps 154 through 156, the values deltaNset, thetatset, and Tiset are set appropriately for ensuring durability of the clutch 21 in this current case that both of the two front vehicle wheels are stationary or both of the two rear vehicle wheels are stationary.

Figure 6B:
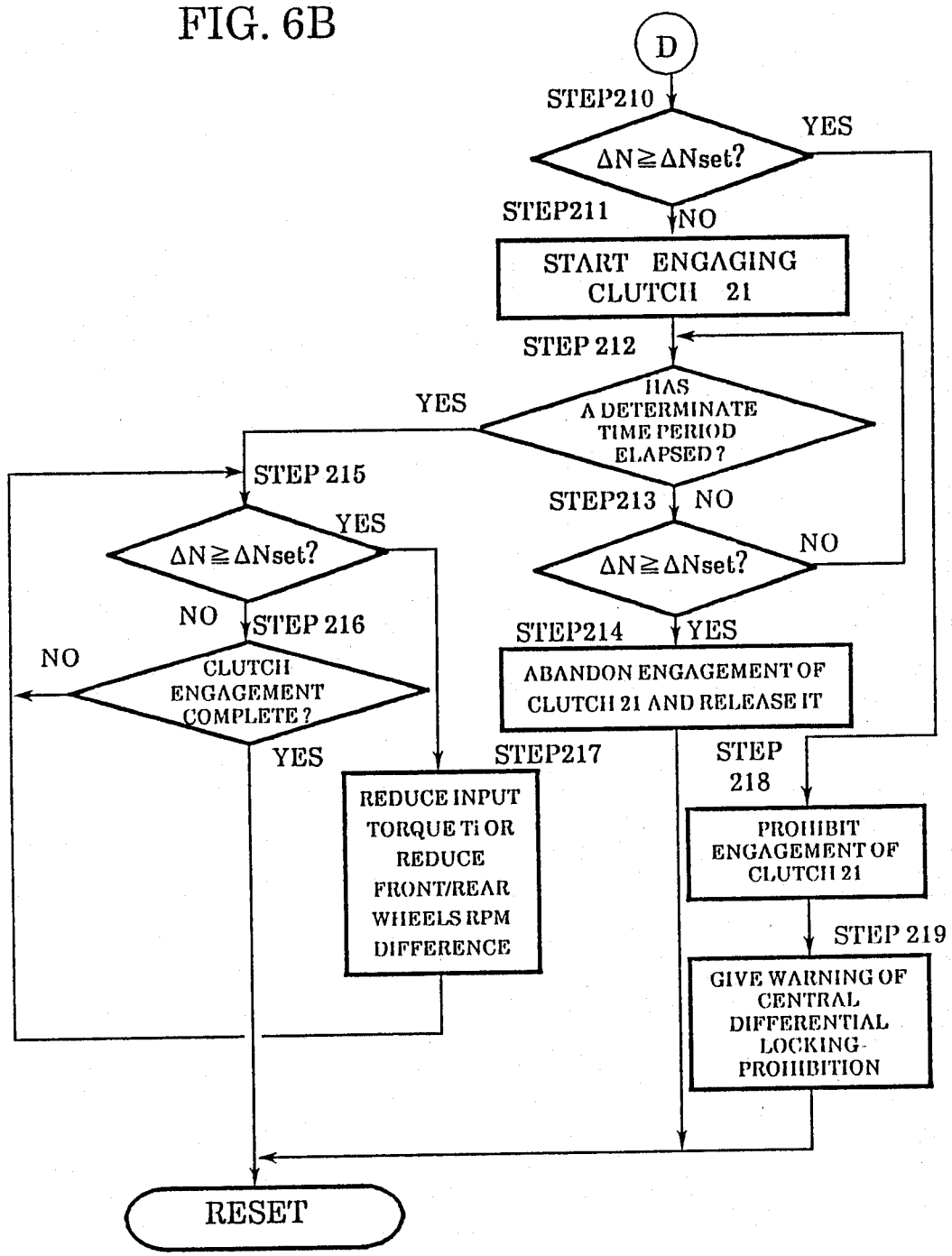
FIG. 6B is a fifth portion of said fragmentary flow chart for showing the operation of this preferred method embodiment, leading from said program point "D" shown in the FIG. 6A flow chart to the end of this program portion.
Figure 7:
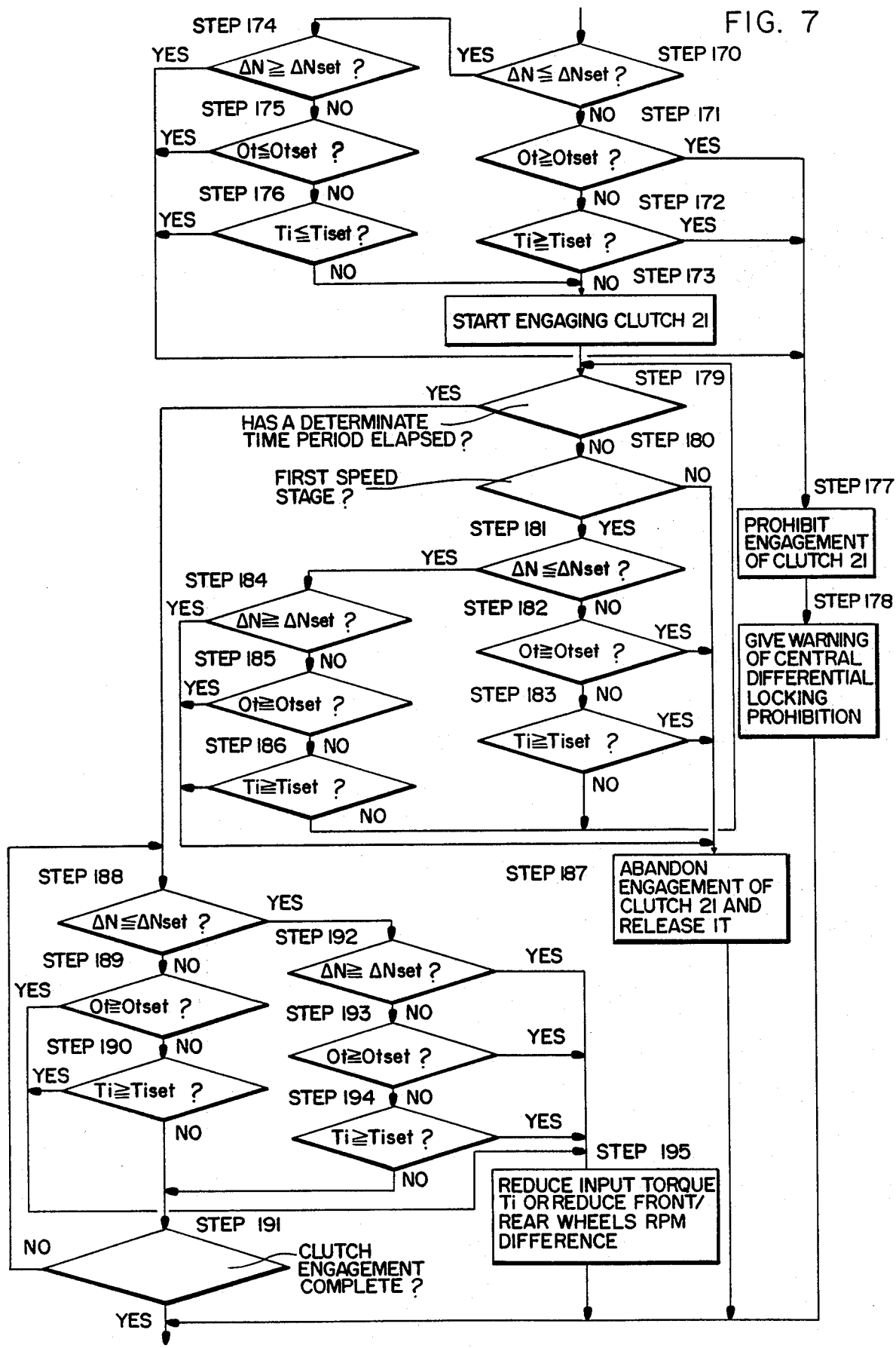
FIG. 7 is a sixth portion of said fragmentary flow chart for showing the operation of this preferred method embodiment, and is an expansion of each one of a set of five steps shown in the FIG. 6A flow chart.

On the other hand, when the decision in the decision step 140 is a NO decision, in other words when it is not the case that either both of the front vehicle wheels are stationary or both of the rear vehicle wheels are stationary, then the flow of control passes, via the program point designated as "C" to the program portion whose partial flow chart is shown in FIG. 6A, and particularly to the decision step 160 thereof. In this next decision step 160, the transmission control device 45 makes a decision as to whether or not it is the case that all four of the vehicle wheels are rotating. If the result of this decision is YES, so that indeed all four of the vehicle wheels are rotating, then the flow of control passes next to the decision step 161; but, if the result of this decision is NO, so that it is not the case that all four of the vehicle wheels are rotating, then the flow of control passes next to the decision step 200. In the decision step 161, the transmission control device 45 makes a decision as to whether or not the N range of the automatic speed change device 2 is currently being set by the driver of the vehicle and is being registered on the set range sensor 51. If the result of this decision is YES, so that indeed the N range of the automatic speed change device 2 is currently being set by the vehicle driver, then the flow of control passes next, via the program point designated as "D", to the program portion whose partial flow chart is shown in FIG. 6B, and particularly to the decision step 210 thereof; but, if the result of this decision is NO, so that in fact currently the N range of the automatic speed change device 2 is not being set by the vehicle driver, then the flow of control passes next to the decision step 162. In this decision step 162, the transmission control device 45 makes a decision as to whether or not the gear transmission mechanism 7 of the automatic speed change device 2 is currently set to the first (forward) speed stage thereof. If the result of this decision is YES, so that said gear transmission mechanism 7 is indeed currently set to its first speed stage, then the flow of control passes next to a block outlined in FIG. 6A by a dot dashed line and the flow chart of which is shown in FIG. 7 which will be described shortly; but, if the result of this decision is NO, so that said gear transmission mechanism 7 is not currently set to its first speed stage, then the flow of control passes next to the decision step 163. Similarly, in this decision step 163, the transmission control device 45 makes a decision as to whether or not the gear transmission mechanism 7 of said automatic speed change device 2 is currently set to the second (forward) speed stage thereof. If the result of this decision is YES, so that said gear transmission mechanism 7 is indeed currently set to its second speed stage, then the flow of control passes next to a set of steps also shown by a dot dashed block and analogous to those shown in the FIG. 7 flow chart; but, if the result of this decision is NO, so that said gear transmission mechanism 7 is not currently set to its first or its second speed stage (either), then the flow of control passes next to the decision step 164. Similarly, in this decision step 164, the transmission control device 45 makes a decision as to whether or not the gear transmission mechanism 7 of said automatic speed change device 2 is currently set to the third (forward) speed stage thereof. If the result of this decision is YES, so that said gear transmission mechanism 7 is indeed currently set to its third speed stage, then the flow of control passes next to another set of steps also shown by a dot dashed block and analogous to those shown in the FIG. 7 flow chart; but, if the result of this decision is NO, so that said gear transmission mechanism 7 is not currently set to its first, its second, or its third speed stage (either), then the flow of control passes next to the decision step 165. And, again similarly, in this decision step 165, the transmission control device 45 makes a decision as to whether or not the gear transmission mechanism 7 of said automatic speed change deviced 2 is currently set to the fourth (forward) speed stage thereof. If the result of this decision is YES, so that said gear transmission mechanism 7 is indeed currently set to its fourth speed stage, then the flow of control passes next to yet another set of steps also shown by a dot dashed block and analogous to those shown in the FIG. 7 flow chart; but, if the result of this decision is NO, so that said gear transmission mechanism 7 is not currently set to its first, its second, its third, or its fourth speed stage (either), and accordingly said gear transmission mechanism 7 must be set to its reverse speed stage, then again the flow of control passes next to yet another set of steps also shown by a dot dashed block and analogous to those shown in the FIG. 7 flow chart.

Now, in FIG. 7, there is shown a flow chart for the case of the step shown in FIG. 6A merely by the dot dashed block on the YES branch from the decision step 162, when it has been ascertained that it is the first speed stage of the gear transmission mechanism 7 of the automatic speed change device 2 which is engaged. This flow chart will now be cursorily explained; the intimate details will be lightly passed over, because in view of the detailed explanation so far given of the FIG. 3 through FIG. 6A flow charts they will be easily supplemented by a reader of ordinary skill in the relevant art without undue experimentation.

First, the decisions in the decision steps 170 through 172 and 174 through 176 test whether, even though the clutch 21 of the center differential device 10 of the four wheel drive power transfer device 3 is engaged, durability problems may arise; when the result of this decision cluster is NO, so that no substantial clutch 21 durability problems arise, then the flow of control passes next to the step 173, and the transmission control device 45 starts the engagement of said clutch 21 of said center differential device 10, and then the flow of control passes next to the next decision step 179. On the other hand, when the result of this decision cluster is NO, so that in this case substantial durability problems arise with regard to the clutch 21, then the flow of control passes next to the step 177, in which the engagement of said clutch 21 is prohibited, in order to ensure that the durability of said clutch 21 should be preserved. Thus, it is avoided that large absorption of energy should be required to be provided by the clutch 21 during its engagement, and thereby the operational lifetime of said clutch 21 is prolonged. Then the flow of control passes next to the step 178, in which a visible or audible warning is given to the driver of the vehicle, by means of a warning device not particularly shown in the figures, in order to apprise him or her of the fact that, against his or her wishes, the center differential device 10 is not in the locked up state. And then the flow of control passes next to exit this program block, without doing anything further.

Figure 8:
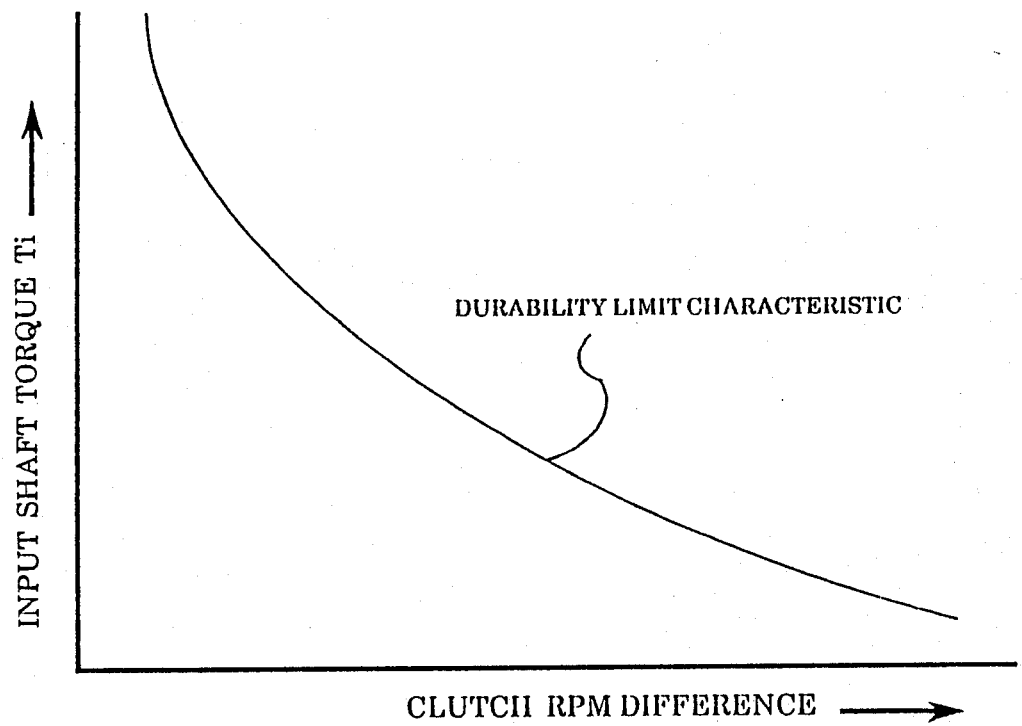
FIG. 8 is a graph for showing durability limit characteristic of the torque transfer clutch of FIG. 2, showing along the vertical axis the magnitude of the input torque which is being supplied to the four wheel drive power transfer device incorporating said clutch, and showing along the horizontal axis the difference between the rotational speed of the input member of said clutch and the rotational speed of the output member of said clutch.
Figure 9:
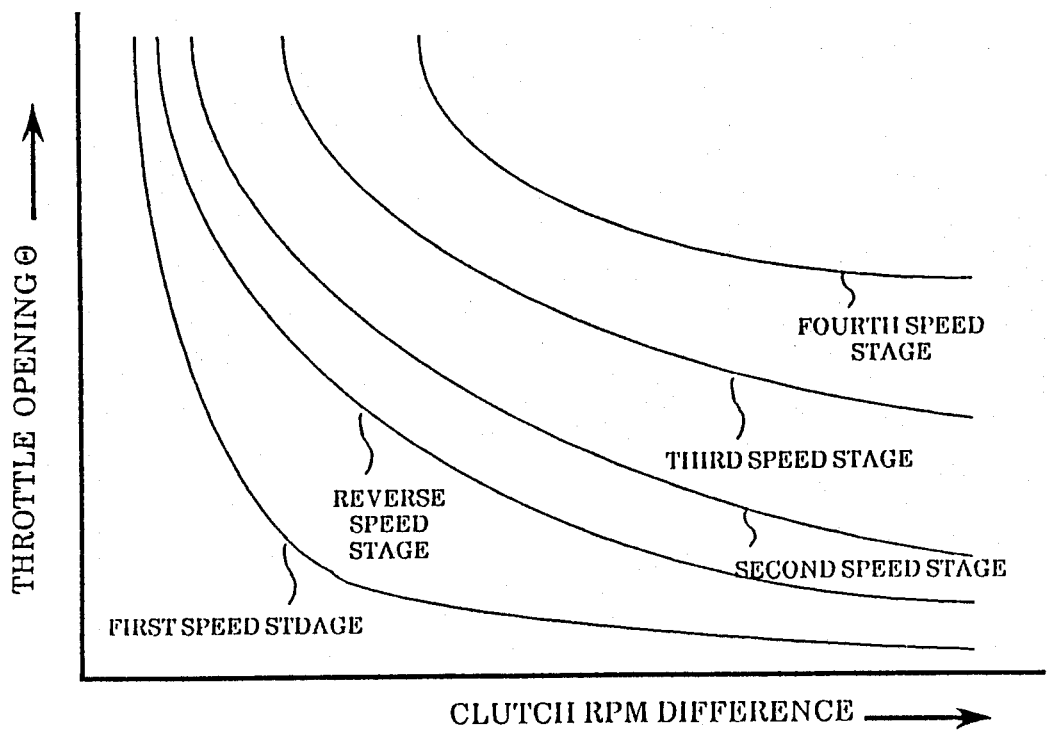
FIG. 9 is another graph for showing durability limit characteristic of said FIG. 2 torque transfer clutch, for each of the speed stages to which the gear transmission mechanism of the vehicle may be engaged, showing along the vertical axis the magnitude of the throttle opening of the engine of the vehicle (which is a parameter which is taken as being representative of engine load), and showing along the horizontal axis the difference between the rotational speed of the input member of said clutch and the rotational speed of the output member of said clutch.

Now, the durability of the clutch 21 is determined by the energy which is absorbed when said clutch 21 is engaged, and the limiting energy absorption characteristics, i.e. the durability limit characteristics, of said clutch 21 with regard to the value of the torque Ti which is being inputted to the four wheel drive power transfer deviced 3 and with regard to the clutch rotational speed difference or clutch slipping speed, i.e. the difference between the rotational speed of the input member of said clutch 21 and the rotational speed of the output member of said clutch 21, are exemplarily shown in the FIG. 8 graph. Replacing the torque Ti inputted to the four wheel drive power transfer device 3 by the throttle opening theta or the engine power output, we get the characteristic curves as shown in the FIG. 9 graph, for each speed stage of the gear transmission mechanism 7. In this figure, the area below and to the left of each of the characteristic limit curves is the operational area in which it is acceptable for the clutch 21 to be engaged when the gear transmission mechanism 7 is engaged to the relevant speed stage thereof, and in the decision steps 170 through 172 and 174 through 176 the engagement of the clutch 21 is determined upon or not, depending upon whether or not the current point in the FIG. 9 phase space lies within this area. In these decision steps 170 through 172 and 174 through 176 a so called two point decision is carried out, and this engagement permitted decision is accordingly a double check.

On the other hand, in the decision step 179, the transmission control device 45 makes a decision as to whether or not a determinate time period has elapsed. If the result of this decision is YES, so that indeed said determinate time period has elapsed, then the flow of control passes next to the decision step 188; but, if the result of this decision is NO, so that in fact said determinate time period has not yet elapsed, then the flow of control passes next to the decision step 180. And, in this next decision step 180, the transmission control device 45 makes a decision as to whether or not the first speed stage of the gear transmission mechanism 7 is still engaged. If the result of this decision is YES, so that the first speed stage is still engaged, then the flow of control passes next to the decision step 181; but, if the result of this decision is NO, so that now the first speed stage is not engaged, then the flow of control passes next to the step 187. And, in the decision steps 181 through 183 and 184 through 186, a check is made as to whether all of the conditions for engagement of the clutch 21 are still holding. If in fact all of these conditions are still holding, then the flow of control passes next back to the previous decision step 179 again, to cycle around in a tight loop until the determinate time period has elapsed; but, if only one of these conditions fails, then the flow of control passes to the step 187. In this step 187, the transmission control device 45 abandons the process of engaging the clutch 21 and instead releases it, thus prohibit the engagement of said clutch 21 in order to prolong the durability thereof, and then the flow of control passes next to the END point of this FIG. 7 flow chart fragment.

On the other hand, if all of the conditions tested for in the decision steps 180 through 183 and 184 through 186 continue to hold from the start of engagement of the clutch 21 until actual torque transmission thereby, then in the next set of decision steps starting with the decision step 188 the transmission control device 45 performs a set of tests similar to what was done before in the block "alpha" of FIG. 3—in summary, if during the engagement of the clutch 21 the difference deltaN between the rotational speed of the rear wheels of the vehicle as detected by the sensors 46 and 47 therefor and the rotational speed of the front wheels of the vehicle as detected by the sensors 48 and 49 therefor falls below the certain value deltaNset, or the output of the engine 1 falls below the certain value thetatset, or the torque being inputted to the four wheel drive power transfer device 3 falls below the certain value Tiset, then in the step 195 the difference between the rotational speed of the rear wheels of the vehicle and the rotational speed of the front wheels of the vehicle is reduced by one means or another. And, in the decision step 191, the transmission control device 45 makes a decision as to whether or not the engagement of the clutch 21 has been completed; if the result of this decision is YES, so that the engagement of the clutch 21 has now been completed, then the flow of control passes next to exit this program fragment, without doing anything further; but, if the result of this decision is NO, so that the engagement of the clutch 21 is not yet completed, then the flow of control passes next back to the decision step 188 again, to cycle around in a loop repeatedly testing the conditions of the decision steps 188 through 190 and 192 through 194, until clutch engagement is in fact completed. Thus, it is avoided that large absorption of energy should be required to be provided by the clutch 21 during its engagement, and thereby the operational lifetime of said clutch 21 is prolonged. Thereby, without releasing the clutch 21, after the state of substantial torque transmission has been reached, the amount of energy which is required to be absorbed by said clutch 21 is suitably limited. After this rotational speed difference reduction has been performed, the flow of control, as before, leaves this FIG. 7 program fragment, without doing anything further.

For other ones of the speed stages of the gear transmission mechanism 7, such as the second speed stage, the third speed stage, the fourth speed stage, and the reverse speed stage thereof, the blocks shown in the FIG. 6A flow chart that correspond to the FIG. 7 program portion are similar, mutatis mutandis.

On the other hand, when the decision in the decision step 161 of the program portion whose flow chart is shown in FIG. 6A is a YES decision, in other words when indeed the automatic speed change device 2 is currently set to the N range, then the flow of control passes, via the program point designated as "D", to the program portion whose partial flow chart is shown in FIG. 6B, and particularly to the decision step 210 thereof. In this decision step 210, the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is YES, so that in fact deltaN is greater than or equal to this determinate threshold value deltaNset, then the flow of control passes next to the step 218; but, if the result of this decision is NO, so that actually deltaN is less than deltaNset, then the flow of control passes next to the step 211. In this case, the clutch engagement permitted decision is not carried out based upon the throttle opening of the engine and the torque Ti which is being inputted to the four wheel drive power transfer device 3, but instead the transmission control device 45 directly starts the engagement of the clutch 21 of the center differential device 10, and then the flow of control passes next to the next decision step 212. On the other hand, if in fact deltaN is greater than or equal to the determinate threshold value deltaNset, then in the step 218 the engagement of the clutch 21 of the center differential device 10 of the four wheel drive power transfer device 3 is prohibited in order to ensure that the durability of said clutch 21 should be preserved. Thus, it is avoided that large absorption of energy should be required to be provided by the clutch 21 during its engagement, and thereby the operational lifetime of said clutch 21 is prolonged. Then the flow of control passes next to the step 219, in which as before a visible or audible warning is given to the driver of the vehicle, by means of a warning device not particularly shown in the figures, in order to apprise him or her of the fact that, against his or her wishes, the center differential device 10 is not in the locked up state.

On the other hand, in the decision steps 212 and 213, for a certain time period while the clutch 21 bites, repeated checks are run in order to ensure that the conditions for clutch engagement hold; if these conditions fail, then the flow of control passes to the step 214, and the transmission control device 45 abandons the process of engaging the clutch 21 and instead releases it, in order to promote durability of the clutch 21, and then the flow of control passes next to the END point of this FIG. 6B flow chart fragement, and the action of this portion of the program for the transmission control device 45 terminates without doing anything further. But, after the determinate time period has elapsed from the start of the engagement of the clutch 21, in other words when said clutch 21 actually has started to transmit torque, the flow of control passes to the decision step 215, and the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is YES, so that actually deltaN is greater than or equal to deltaNset, then the flow of control passes next to the step 217; but, it the result of this decision is NO, so that in fact deltaN is less than this determinate threshold value deltaNset, then the flow of control passes next to the decision step 216. And, in the step 217, a form of control is performed which reduces the difference between the rotational speed of the rear wheels of the vehicle as detected by the sensors 46 and 47 therefor and the rotational speed of the front wheels of the vehicle as detected by the sensors 48 and 49 therefor: this control may be provided by reducing the amount of fuel injection to the internal combustion engine 1 via the engine control device 55 and/or by delaying the ignition timing of said internal combustion engine 1, or in some other manner such as by reducing the torque Ti which is being inputted to the four wheel drive power transfer device 3 by upshifting the gear transmission mechanism 7 of the automatic speed change device 2. Thus, it is avoided that large absorption of energy should be required to be provided by the clutch 21 during its engagement, and thereby the operational lifetime of said clutch 21 is prolonged.

In the decision steps 210, 213, and 215 the value deltaNset is a suitable and appropriate value for ensuring the durability of the clutch 21 when the automatic speed change device 2 is set to its N range.

Referring back again to the FIG. 6A flow chart, when in the step 160 it is decided that it is not the case that all of the four vehicle wheels are rotating, then the flow of control passes to the decision step 200. In this decision step 200, the transmission control device 45 makes a decision as to whether or not only one vehicle wheel is stationary. If the result of this decision is YES, so that three of the vehicle wheels are stationary and only one of said vehicle wheels is rotating, then the flow of control passes next to the decision step 201; but, if the result of this decision is NO, so that it is not the case that only one vehicle wheel is stationary, then the flow of control passes next to the decision step 204.

In the decision step 201, which is only reached if it is decided that one and one only of the vehicle wheels is not rotating, which is an extremely rare occurrence, the transmission control device 45 makes a decision as to whether or not the difference deltaN between the rotational speed of the rear wheels of the vehicle and the rotational speed of the front wheels of the vehicle is greater than or equal to a determinate value deltaNset. If the result of this decision is YES, so that actually deltaN is greater than or equal to deltaNset, then the flow of control passes next to the step 202; but, if the result of this decision is NO, so that in fact deltaN is less than this determinate threshold value deltaNset, then the flow of control passes next to the step 208. In the step 202, it is established that one wheel is really stationary while the other three wheels are slipping, and as before the engagement of the clutch 21 of the center differential device 10 of the four wheel drive power transfer device 3 is prohibited, and thus it is avoided that large absorption of energy should be required to be provided by the clutch 21 during its engagement, and thereby the operational lifetime of said clutch 21 is prolonged. Then the flow of control passes next to the step 203, in which a visible or audible warning is given to the driver of the vehicle, by means of a warning device not particularly shown in the figures, in order to apprise him or her of the fact that, against his or her wishes, the center differential device 10 is not in the locked up state. On the other hand, if the value of deltaN is substantially zero it is not possible to imagine a possible operational state for the vehicle, and therefore it is to be assumed that one of the rotational speed sensors for one of the vehicle wheels has failed, and accordingly in the step 108 failure mode processing is performed. In either case, next the flow of control leaves this program fragment, without doing anything further.

However, when it has been decided in the decision step 200 that it is not the case that only one of the vehicle wheels is stationary, then in the decision step 204 the transmission control deviced 45 makes a decision as to whether or not it is the case that one of the front vehicle wheels is stationary and also one of the rear vehicle wheels is stationary. If the result of this decision is NO, so that it is not the case that one of the front vehicle wheels is stationary and also one of the rear vehicle wheels is stationary, then this is not an imaginable operational situation, and therefore the flow of control passes next to the step 209, and a mode of investigate processing is performed; but, if the result of this decision is YES, so the indeed it is the case that one of the front vehicle wheels is stationary and also one of the rear vehicle wheels is stationary, then the flow of control passes next to the decision step 205. In this next decision step 205, the transmission control device 45 makes a decision as to whether or not the difference deltaN between the rotational speed of the rear wheels of the vehicle as detected by the sensors 46 and 47 therefor and the rotational speed of the front wheels of the vehicle as detected by the sensors 48 and 49 therefor is substantially zero. If the result of this decision is YES, so that indeed deltaN is substantially zero, then the flow of control passes next to the step 206; but, if the result of this decision is NO, so that deltaN is not substantially zero, then again this is not an imaginable operational situation, and therefore the flow of control passes next to the step 209, and a mode of investigate processing is performed. On the other hand, in the step 206, at which point it is established that the clutch 21 is engaged and the center differential device 10 is locked up, the transmission control device 45 issues a warning that the operation of said center differential device 10 is abnormal, and then the flow of control passes next to the step 207, in which problem check operation of said clutch 21 and of the center differential device 10 is commenced. In either case, next the flow of control leaves this program fragment, without doing anything further.

Conclusion

As a matter of course, the load on the internal combustion engine 1 could alternatively be determined, not by the opening of a throttle valve of a carburetor thereof as was in the case in the various above disclosed preferred device and method embodiments, but according to the amount of depression of an accelerator pedal fitted in the passenger compartment of the vehicle and adapted to be depressed by the foot of the vehicle driver, or according to the amount of fuel which is injected to the cylinders of said engine 1 (in the case that fuel injection is the form of fuel provision which is equipped to said engine 1), or according to the torque supplied by said engine 1 to its power output shaft (its crank shaft), or the like. All such variations should be considered as being within the scope of the present invention.

It is acceptable, according to the principle of the present invention if the constructional details of the system are varied, although the shown ones are considered to be preferred. For example, the friction engaging device for providing torque distribution between the pair of front wheels of the vehicle and the pair of rear wheels of the vehicle could, in other embodiments, be a clutch provided in the power transmission path either to the pair of front vehicle wheels or to the pair of rear vehicle wheels and restricting or the flow of controlling the amount of torque supplied to its pair of vehicle wheels, rather than being a central differential control clutch like the clutches 21 and 64 of the shown preferred embodiments. Other modifications could also be conceived of. Therefore, although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive vehicle with two front wheels, two rear wheels, a four wheel drive device, and an engine, rotational power from said engine being provided via said four wheel drive device to the combination of the front wheels of said vehicle and also to the combination of the rear wheels of said vehicle, and further comprising a front/rear coupling device fitted to said four wheel drive device for selectively coupling the rotation of said combination of said front vehicle wheels and the rotation of said combination of said rear vehicle wheels:

a device for controlling said front/rear coupling device, comprising:
(a) a means for detecting the rotational speed of said combination of the front wheels of said vehicle;
(b) a means for detecting the rotational speed of said combination of the rear wheels of said vehicle; and:
(c) a means for controlling said front/rear coupling device, so that: said operation of said front/rear coupling device is substantially not restricted when the discrepancy between the rotational speed of said combination of the front wheels of said vehicle and the rotational speed of said combination of the rear wheels of said vehicle is not greater than a certain threshold value; and, when the discrepancy between the rotational speed of said combination of the front wheels of said vehicle and the rotational speed of said combination of the rear wheels of said vehicle is greater than said certain threshold value, coupling between the rotation of said combination of said front vehicle wheels and the rotation of said combination of said rear vehicle wheels by said front/rear coupling device is substantially prohibited.

2. A front/rear coupling device control device according to claim 1, wherein said discrepancy between the rotational speed of said combination of the front wheels of said vehicle and the rotational speed of said combination of the rear wheels of said vehicle is a rotational speed difference.

3. A front/rear coupling device control device according to claim 1, wherein said discrepancy between the rotational speed of said combination of the front wheels of said vehicle and the rotational speed of said combination of the rear wheels of said vehicle is a rotational speed ratio.

4. A front/rear coupling device control device according to claim 1, further comprising a means for detecting the value of torque which is being inputted to said four wheel drive device, wherein said certain threshold value of discrepancy between the rotational speed of said front wheels of said vehicle is smaller when the value of torque which is being inputted to said four wheel drive device increases.

5. A front/rear coupling device control device according to claim 1, said vehicle further comprising a speed change device provided in the power train between said engine and said four wheel drive device, wherein said certain threshold value of discrepancy between the rotational speed of said rear wheels of said vehicle and the rotational speed of said front wheels of said vehicle is smaller when the speed stage to which said speed change device is set is lower.

6. A front/rear coupling device control device according to claim 1, wherein said certain threshold value of discrepancy between the rotational speed of said rear wheels of said vehicle and the rotational speed of said front wheels of said vehicle is smaller when the value of output torque of said engine increases.

7. A front/rear coupling device control device according to claim 6, said vehicle further comprising a speed change device provided in the power train between said engine and said four wheel drive device, wherein said certain threshold value of discrepancy between the rotational speed of said rear wheels of said vehicle and the rotational speed of said front wheels of said vehicle is smaller when the speed stage to which said speed change device is set is lower.

8. For a four wheel drive vehicle with two front wheels, two rear wheels, a four wheel drive device, and an engine, rotational power from said engine being provided via said four wheel drive device to the combination of the front wheels of said vehicle and also to the combination of the rear wheels of said vehicle, and further comprising a front/rear coupling device fitted to said four wheel drive device for selectively coupling the rotation of said combination of said front vehicle wheels and the rotation of said combination of said rear vehicle wheels:
a method for controlling said front/rear coupling device, wherein:
(a) the rotational speed of said combination of the front wheels of said vehicle is detected;
(b) the rotational speed of said combination of the rear wheels of said vehicle is detected; and:
(c) said front/rear coupling device is controlled, so that: said operation of said front/rear coupling device is substantially not restricted when the discrepancy between the rotational speed of said combination of the front wheels of said vehicle and the rotational speed of said combination of the rear wheels of said vehicle is not greater than a certain threshold value; and, when the discrepancy between the rotational speed of said combination of the front wheels of said vehicle and the rotational speed of said combination of the rear wheels of said vehicle is greater than said certain threshold value, coupling between the rotation of said combination of said front vehicle wheels and the rotation of said combination of said rear vehicle wheels by said front/rear coupling device is substantially prohibited.

9. A front/rear coupling device control method according to claim 8, wherein said discrepancy between the rotational speed of said combination of the front wheels of said vehicle and the rotational speed of said combination of the rear wheels of said vehicle is a rotational speed difference.

10. A front/rear coupling device control method according to claim 8, wherein said discrepancy between the rotational speed of said combination of the front wheels of said vehicle and the rotational speed of said combination of the rear wheels of said vehicle is a rotational speed ratio.

11. A front/rear coupling device control method according to claim 8, wherein the value of torque which is being inputted to said four wheel drive device is detected, and wherein said certain threshold value of discrepancy between the rotational speed of said rear wheels of said vehicle and the rotational speed of said front wheels of said vehicle is smaller when the value of the torque which is being inputted to said four wheel drive device increases.

12. A front/rear coupling device control method according to claim 8, said vehicle further comprising a speed change device provided in the power train between said engine and said four wheel drive device, wherein said certain threshold value of discrepancy between the rotational speed of said front wheels of said vehicle is smaller when the speed stage to which said speed change device is set is lower.

13. A front/rear coupling device control method according to claim 8, wherein said certain threshold value or discrepancy between the rotational speed of said rear wheels of said vehicle and the rotational speed of said front wheels of said vehicle is smaller when the value of output torque of said engine increases.

14. A front/rear coupling device control method according to claim 13, said vehicle further comprising a speed change device provided in the power train between said engine and said four wheel drive device, wherein said certain threshold value of discrepancy between the rotational speed of said rear wheels of said vehicle and the rotational speed of said front wheels of said vehicle is smaller when the speed stage to which said speed change device is set is lower.

* * * * *